United States Patent
Chen et al.

(10) Patent No.: US 12,538,305 B2
(45) Date of Patent: Jan. 27, 2026

(54) TECHNIQUES FOR DYNAMIC SWITCHING BETWEEN ASYMMETRIC ANTENNA PANELS FOR UPLINK

(71) Applicant: QUALCOMM Incorporated, San Diego, CA (US)

(72) Inventors: Yitao Chen, San Marcos, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 18/505,842

(22) Filed: Nov. 9, 2023

(65) Prior Publication Data

US 2024/0260029 A1 Aug. 1, 2024

Related U.S. Application Data

(60) Provisional application No. 63/481,785, filed on Jan. 26, 2023.

(51) Int. Cl.
*H04W 72/1268* (2023.01)
*H04L 5/00* (2006.01)
*H04W 72/20* (2023.01)

(52) U.S. Cl.
CPC ....... *H04W 72/1268* (2013.01); *H04L 5/0051* (2013.01); *H04W 72/20* (2023.01)

(58) Field of Classification Search
None
See application file for complete search history.

(56) References Cited

U.S. PATENT DOCUMENTS

2018/0220458 A1* 8/2018 Ouchi ............... H04L 27/01
2019/0074883 A1* 3/2019 Park ................ H04L 5/0057
(Continued)

OTHER PUBLICATIONS

Gaal P (Qualcomm Incorporated)., et al., "Simultaneous Multi-Panel Transmission", 3GPP Draft, 3GPP TSG RAN WG1 #111, R1-2212104, Type Discussion, NR_MIMO_DL_UL-CORE, 3rd Generation Partnership Project, Mobile Competence Centre, 650, Route Des Lucioles, F-06921 Sophia-Antipolis Cedex, France, vol. 3GPP RAN 1, No. Toulouse, France, Nov. 14-Nov. 18, 2022, Nov. 5, 2022, XP052222668, 18 pages, pp. 3, 14-15.
(Continued)

*Primary Examiner* — Faiyazkhan Ghafoerkhan
(74) *Attorney, Agent, or Firm* — Holland & Hart LLP

(57) ABSTRACT

Methods, systems, and devices for wireless communications are described. The techniques described herein relate to dynamic transmission of sounding reference signals (SRSs) by a user equipment (UE) to support dynamic switching between asymmetric antenna panels at the UE. The UE may transmit a beam report to a network entity that indicates a maximum quantity of SRS resources supported by the UE for a physical uplink shared channel (PUSCH) for a given beam. The UE may transmit a quantity of SRSs to the network entity equal to the maximum quantity. The network entity may indicate a subset of the SRS resources for the UE to use for a PUSCH, and the UE may transmit a PUSCH using a quantity of ports equal to the quantity of indicated SRS resources. The UE may indicate multiple maximum quantities of SRS resources supported by the UE for multiple overlapping PUSCH.

30 Claims, 19 Drawing Sheets

(56) References Cited

U.S. PATENT DOCUMENTS

| | | | |
|---|---|---|---|
| 2019/0174527 A1* | 6/2019 | Park | H04L 5/0046 |
| 2019/0199553 A1* | 6/2019 | Park | H04B 7/0486 |
| 2019/0200380 A1* | 6/2019 | Park | H04L 5/0046 |
| 2019/0207731 A1* | 7/2019 | Park | H04B 7/0486 |
| 2019/0222277 A1* | 7/2019 | Park | H04L 5/0094 |
| 2019/0379501 A1* | 12/2019 | Park | H04B 7/0456 |
| 2020/0213054 A1* | 7/2020 | Park | H04L 5/0048 |
| 2020/0236574 A1* | 7/2020 | Ohuchi | H04L 5/0057 |
| 2020/0245333 A1* | 7/2020 | Lin | H04L 1/0026 |
| 2020/0403669 A1* | 12/2020 | Park | H04B 7/065 |
| 2021/0195532 A1* | 6/2021 | Ouchi | H04W 52/50 |
| 2022/0123799 A1* | 4/2022 | Varatharaajan | H04L 5/0048 |
| 2022/0279518 A1* | 9/2022 | Lin | H04L 5/0094 |
| 2024/0223241 A1* | 7/2024 | Lee | H04B 7/024 |
| 2024/0260029 A1* | 8/2024 | Chen | H04L 5/0048 |

OTHER PUBLICATIONS

Partial International Search Report—PCT/US2024/012114—ISA/EPO—May 10, 2024 (2301760WO).

Zhu M (Catt)., et al., "Discussion on Unified TCI Framework Extension for Multi-TRP Operation", 3GPP Draft, 3GPP TSG-RAN WG1 #111, R1-2211167, Type Discussion, NR_MIMO_DL_UL-CORE, 3rd Generation Partnership Project, Mobile Competence Centre, 650, Route Des Lucioles, F-06921 Sophia-Antipolis Cedex, France, vol. 3GPP RAN 1, No. Toulouse, France, Nov. 14-Nov. 18, 2022, Nov. 7, 2022, XP052221732, 12 pages, pp. 4,7.

International Search Report and Written Opinion—PCT/US2024/012114—ISA/EPO—Aug. 7, 2024 (2301760WO).

ZTE: "Enhancements on Unified TCI Framework Extension for Multi-TRP", R1-2203263, 3GPP TSG RAN WG1 Meeting #109-e, 3rd Generation Partnership Project, Mobile Competence Centre, 650, Route Des Lucioles, F-06921 Sophia-Antipolis Cedex, France vol. RAN WG1, No. e-Meeting, May 9-May 20, 2022 Apr. 29, 2022, XP052152899, 9 Pages.

ZTE: "Enhancements on Unified TCI Framework Extension for Multi-TRP", R1-2205918, 3GPP TSG RAN WG1 Meeting #110, 3rd Generation Partnership Project, Mobile Competence Centre, 650, Route Des Lucioles, F-06921 Sophia-Antipolis Cedex, France vol. RAN WG1, No. Toulouse, France, Aug. 22-Aug. 26, 2022 Aug. 12, 2022, XP052273848, 11 Pages, pp. 1-2.

\* cited by examiner

TECHNIQUES FOR DYNAMIC SWITCHING BETWEEN ASYMMETRIC ANTENNA PANELS FOR UPLINK

CROSS REFERENCE

The present Application for Patent claims the benefit of U.S. Provisional Patent Application No. 63/481,785 by CHEN et al., entitled "TECHNIQUES FOR DYNAMIC SWITCHING BETWEEN ASYMMETRIC ANTENNA PANELS FOR UPLINK," filed Jan. 26, 2023, assigned to the assignee hereof, and expressly incorporated by reference in its entirety herein.

FIELD OF TECHNOLOGY

The following relates to wireless communications, including techniques for dynamic switching between asymmetric antenna panels for uplink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for dynamic switching between asymmetric antenna panels for uplink communications. For example, the described techniques provide for dynamic transmission of sounding reference signals (SRSs) by a user equipment (UE) to support dynamic switching between asymmetric antenna panels at the UE. A network entity may transmit, to the UE, a downlink reference signal associated with a transmission configuration indicator (TCI) state of a channel state information (CSI) reference signal. The UE may transmit a beam report to a network entity that indicates a maximum quantity of SRS resources (e.g., associated with the downlink reference signal) supported by the UE for a physical uplink shared channel (PUSCH) transmission. The UE may transmit a quantity of SRSs to the network entity equal to the maximum quantity indicated in the beam report. For example, the UE may transmit the SRSs autonomously or in response to signaling (e.g., an acknowledgment of the beam report or a request) from the network entity, thereby supporting dynamic switching between asymmetric antenna panels at the UE. The network entity may indicate, in a scheduling information for a PUSCH, a subset of the SRS resources for the UE to use for the PUSCH. The UE may transmit the PUSCH via the subset of SRS resources.

In some examples, the UE may indicate, in the beam report, multiple maximum quantities of SRS resources supported by the UE for multiple overlapping PUSCH transmissions. In such examples, the network entity may indicate multiple subsets of SRS resources for the UE to use in transmission of overlapping PUSCH transmissions.

DETAILED DESCRIPTION

Figure 1:
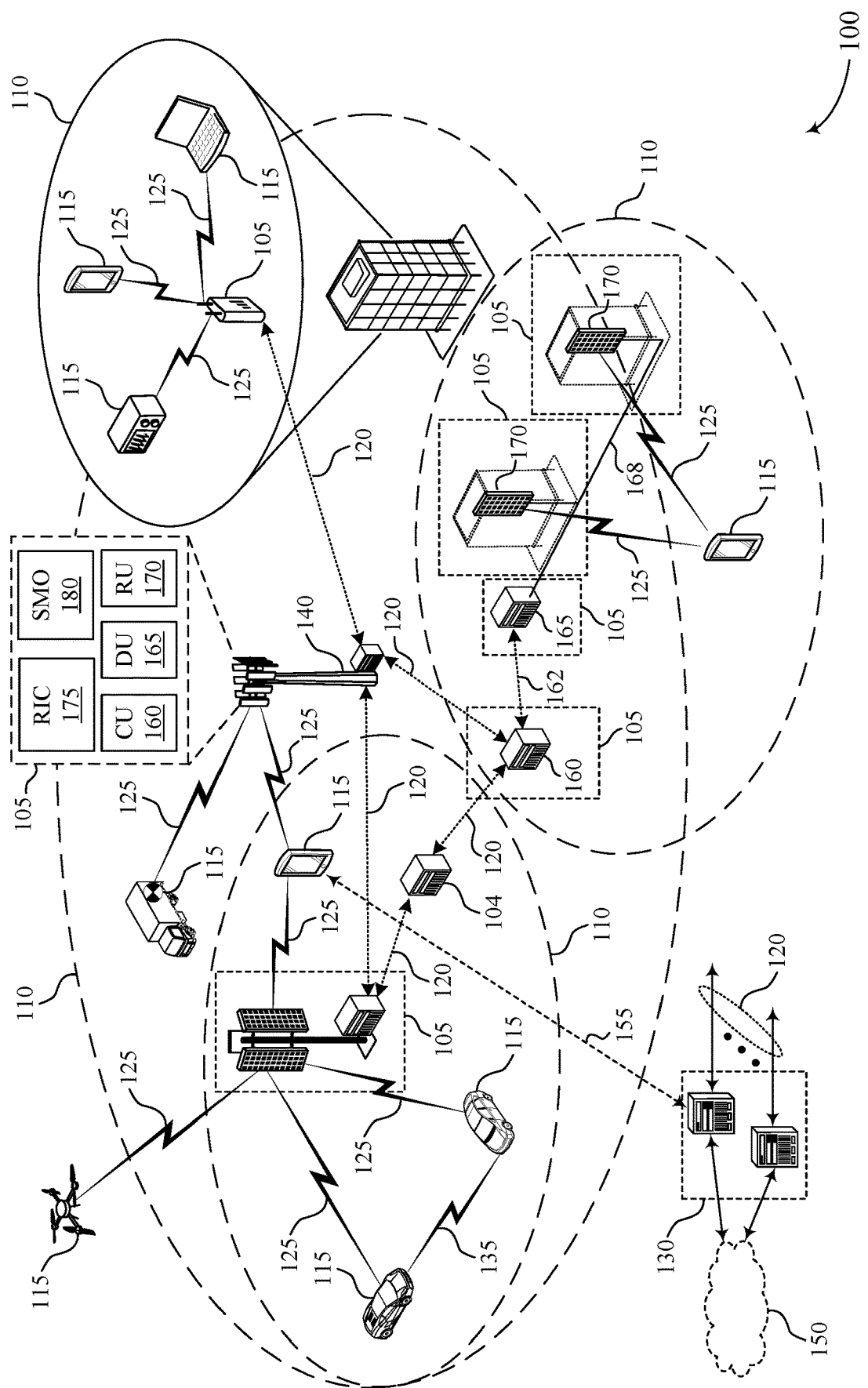
FIG. 1 illustrates an example of a wireless communications system that supports techniques for dynamic switching between asymmetric antenna panels for uplink in accordance with one or more aspects of the present disclosure.

In non-codebook based communications, a user equipment (UE) may measure downlink reference signals (e.g., channel state information reference signals (CSI-RSs)) transmitted by a network entity. The UE may calculate precoding candidates based on the measured downlink reference signals. In contrast, in codebook-based transmissions, the UE may be provided with a precoding matrix indicator (PMI) that is mapped to a codebook or precoding parameters. In non-codebook based communications, the UE may transmit one or more sounding reference signals (SRSs) via configured SRS resources to the network entity using the determined precoding candidates, and the network entity may measure the SRSs to determine a quality (e.g., a received signal strength, spectrum efficiencies, etc.) of the precoding candidates. The network entity may indicate a subset of the SRS resources for a physical uplink shared channel (PUSCH) using an SRS resource indicator (SRI) in a scheduling information for the PUSCH (e.g., in a downlink control information (DCI) scheduling the PUSCH). In non-codebook based PUSCH transmissions, each SRS resource may use one SRS port, and accordingly, the number of indicated SRS resources for a PUSCH may determine a rank (i.e., a number of layers) of the uplink transmission. The UE may report a maximum number of SRS ports supported for a given beam in a beam report. Currently, however, the UE may conduct SRS sounding when scheduled by the network entity via radio resource control (RRC) signaling. Thus, the UE may not dynamically transmit SRSs if an active antenna panel changes (e.g., based on a new strongest beam), and therefore the supported number of SRS ports increases or decreases.

Techniques described herein support methods for dynamic transmission of SRSs for switching between asymmetric antenna panels at a UE (e.g., with different supported quantities of ports) in non-codebook based uplink communications. For example, in response to transmitting a beam report indicating a strongest beam (e.g., based on a downlink reference signal), the UE may transmit a set of SRSs using a subset of SRS resources configured for the downlink reference signal. For example, the UE may receive RRC signaling configuring a set of SRS resources that are associated with a downlink reference signal. The quantity of SRSs that the UE transmits may be equal to the maximum quantity of SRS resources supported by the UE indicated in the beam report. The beam report may be transmitted in an uplink control information (UCI). In one example, the UE may autonomously transmit the SRSs after transmission of the beam report. In another example, the UE may transmit the SRSs in response to an acknowledgment from the network entity for reception of the beam report. In another example, the network entity may transmit a request to the UE for transmission of the SRSs. The maximum quantity of SRS resources indicated in the beam report may be equal to the maximum quantity of uplink ports (e.g., SRS/PUSCH ports) of an antenna panel of the UE used to receive the downlink reference signal (e.g., a CSI-RS or a synchronization signal block (SSB)). The network entity may receive and measure the SRSs. Based on the SRSs, the network entity may schedule a PUSCH and indicate to the UE, in an SRI, which SRS resources to use for the PUSCH. The UE may accordingly transmit the PUSCH using a quantity of PUSCH ports equal to the number of indicated SRS resources.

In some examples, the UE may transmit SRSs for a second beam for overlapping PUSCH transmissions, for example in multi-DCI multi-transmission reception point (TRP) or single DCI multi-TRP scenarios. In such scenarios, the UE may indicate a maximum quantity of SRS resources supported by the UE for each beam for overlapping PUSCH transmissions, and the quantity of SRSs transmitted by the UE for each beam may be equal to the maximum quantity of SRS resources supported by the UE for each beam.

Aspects of the disclosure are initially described in the context of wireless communications systems. Aspects of the disclosure are further illustrated by and described with reference to resource diagrams, process flows, apparatus diagrams, system diagrams, and flowcharts that relate to techniques for dynamic switching between asymmetric antenna panels for uplink.

FIG. 1 illustrates an example of a wireless communications system 100 that supports techniques for dynamic switching between asymmetric antenna panels for uplink in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a TRP. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for dynamic switching between asymmetric antenna panels for uplink as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Techniques described herein support methods for dynamic transmission of SRSs for switching between asymmetric antenna panels at a UE 115 (e.g., with different supported quantities of ports) in non-codebook based uplink communications. For example, in response to transmitting a beam report indicating a strongest beam (e.g., based on a downlink reference signal), the UE 115 may transmit a set of SRSs using a subset of SRS resources configured for the downlink reference signal. For example, the UE 115 may receive RRC signaling configuring a set of SRS resources that are associated with a downlink reference signal. The quantity of SRSs that the UE 115 transmits may be equal to the maximum quantity of SRS resources supported by the UE 115 indicated in the beam report. The beam report may be transmitted in a UCI. In one example, the UE 115 may autonomously transmit the SRSs after transmission of the beam report. In another example, the UE 115 may transmit the SRSs in response to an acknowledgment from the network entity 105 for reception of the beam report. In another example, the network entity 105 may transmit a request to the UE 115 for transmission of the SRSs. The maximum quantity of SRS resources indicated in the beam report may be equal to the maximum quantity of uplink ports (e.g., SRS/PUSCH ports) of an antenna panel of the UE 115 used to receive the downlink reference signal (e.g., a CSI-RS or an SSB). The network entity 105 may receive and measure the SRSs. Based on the SRSs, the network entity 105 may schedule a PUSCH and indicate to the UE 115, in an SRI, which SRS resources to use for the PUSCH. The UE 115 may accordingly transmit the PUSCH using a quantity of PUSCH ports equal to the number of indicated SRS resources.

The UE 115 may transmit SRSs for a second beam for overlapping PUSCH transmissions, for example in multi-DCI multi-TRP or single DCI multi-TRP scenarios. In such scenarios, the UE 115 may indicate a maximum quantity of SRS resources supported by the UE 115 for each beam for overlapping PUSCH transmissions, and the quantity of SRSs transmitted by the UE 115 for each beam may be equal to the maximum quantity of SRS resources supported by the UE 115 for each beam.

Figure 2:
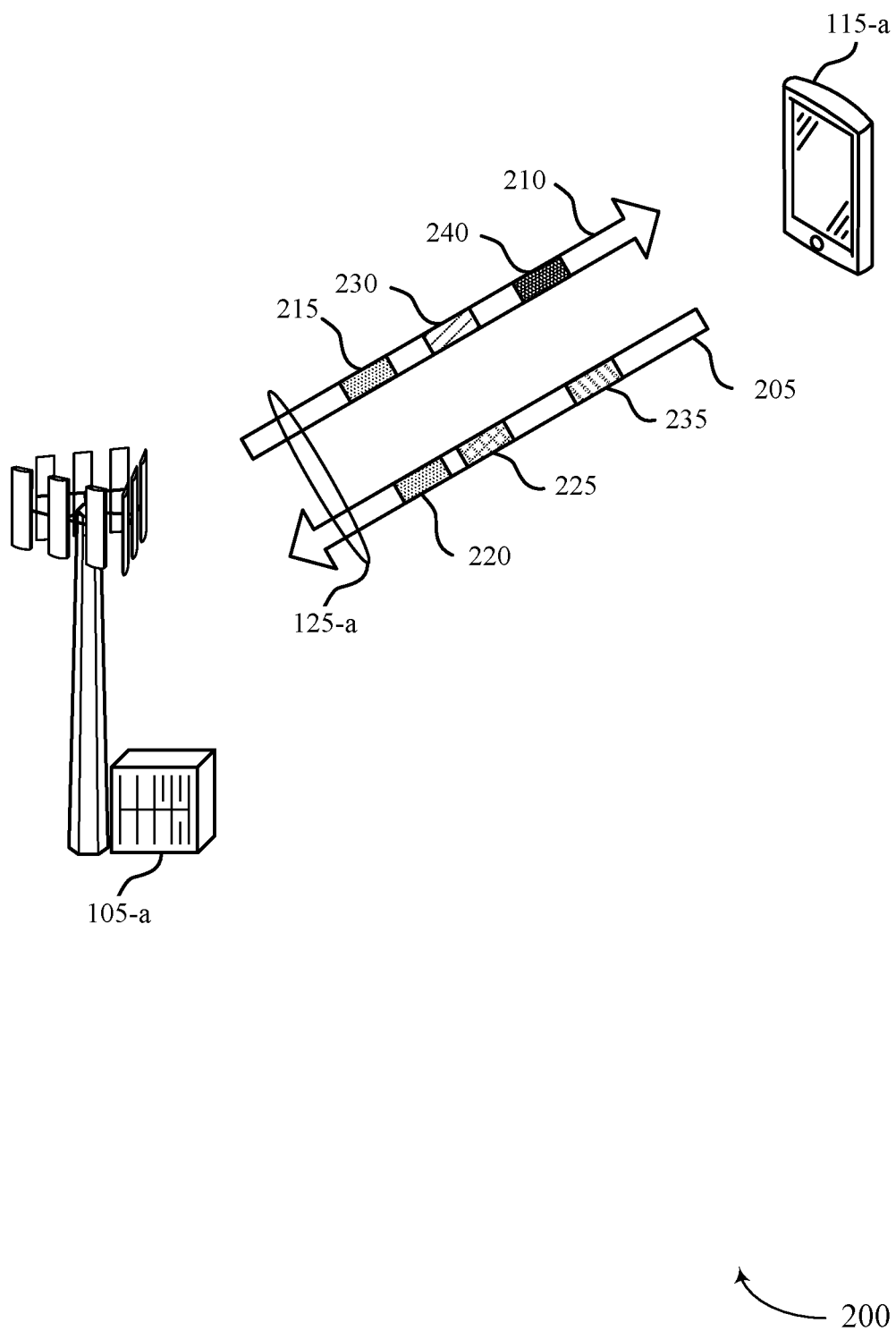
FIG. 2 illustrates an example of a wireless communications system that supports techniques for dynamic switching between asymmetric antenna panels for uplink in accordance with one or more aspects of the present disclosure.

FIG. 2 illustrates an example of a wireless communications system 200 that supports dynamic panel switching for non-codebook based uplink communications in accordance with one or more aspects of the present disclosure. The wireless communications system 200 may implement aspects of or may be implemented by aspects of the wireless communications system 100. For example, the wireless communications system 200 may include a UE 115 (e.g., a UE 115-*a*) and a network entity 105 (e.g., a network entity 105-*a*), which may be examples of the corresponding devices as described with reference to FIG. 1.

The UE 115-*a* may communicate with the network entity 105-*a* using a communication link 125-*a*. The communication link 125-*a* may be an example of an NR or LTE link between the UE 115-*a* and the network entity 105-*a*. The communication link 125-*a* may include bi-directional links that enable both uplink and downlink communications. For example, the UE 115-*a* may transmit uplink signals 205 (e.g., uplink transmissions), such as uplink control signals or uplink data signals, to the network entity 105-*a* using the communication link 125-*a* and the network entity 105-*a* may transmit downlink signals 210 (e.g., downlink transmissions), such as downlink control signals or downlink data signals, to the UE 115-*a* using the communication link 125-*a*.

In some examples of the wireless communications system 200, the UE 115-*a* may communicate with the network entity 105-*a* via codebook based uplink transmissions. In such examples, the UE 115-*a* may be configured, for example, via RRC signaling, with one SRS resource set, with a parameter "usage" set to "codebook." In some examples, up to four SRS resources within an SRS resource set may be configured for the UE 115-*a*. In codebook based transmissions, each SRS resource may use a number of SRS ports given by an RRC parameter "nofSRS-Ports." The network entity 105-*a* may transmit, in an uplink DCI (e.g., a DCI scheduling a PUSCH), an SRI. The SRI may indicate one SRS resource for the UE 115-*a* to use for PUSCH, and the number of ports configured for the SRS resource may determine the number of antenna ports for a PUSCH. The PUSCH may be transmitted using the same spatial domain filter (e.g., beam) as the indicated SRS resources. The network entity 105-*a* may indicate a number of layers (e.g., a rank) and a transmission precoding matrix index (TPMI) for the PUSCH transmission in a separate DCI field (e.g., a DCI field "precoding information and number of layers").

In some other examples of the wireless communications system 200, the UE 115-*a* may communicate with the network entity 105-*a* via non-codebook based uplink transmissions. In non-codebook based PUSCH, the UE 115-*a* may be configured, for example via RRC signaling, with one SRS resource set, with a parameter "usage" set to "non-codebook." In non-codebook based PUSCH, each SRS resource may use one SRS port, and accordingly, the quantity of indicated SRS resources for a PUSCH may determine the rank (e.g., the quantity of layers) of the PUSCH. In some examples, up to four SRS resources within an SRS resource set may be configured for the UE 115-*a*. The UE 115-*a* may report, in a beam report 220 to the network entity 105-*a*, a quantity (e.g., a maximum quantity) of SRS resources that may be supported for a given beam. The SRI field in the scheduling DCI may indicate one or multiple SRS resources for a scheduled PUSCH, and the PUSCH may be transmitted using the same precoder and spatial domain filter (e.g., beam) as the indicated SRS resources. The size of the SRI field may be a function of the quantity of SRS resources in the SRS resource set configured for the UE.

For non-codebook based PUSCH, the UE 115-*a* may measure downlink CSI-RSs transmitted the network entity 105-*a* and calculate precoding candidates. The UE 115-*a* may transmit one or more SRSs 225 to the network entity 105-*a* using the determined precoding candidates, and the network entity 105-*a* may measure the SRS(s) 225 to determine the quality (e.g., signal strength, spectrum efficiencies, etc.) of the precoding candidates. The network entity 105-*a* may indicate, via an SRI in a scheduling DCI 230, a subset of the SRS resources for the UE 115-*a* to use for a PUSCH 235.

Techniques described herein may support methods for dynamic transmission of SRSs 225 for switching between asymmetric panels (e.g., with different quantities of ports) in non-codebook based uplink communications. In some examples, the UE 115-*a* may receive, from the network entity 105-*a*, a control message 215 indicating a set of SRS resources associated with a CSI-RS 240. The UE 115-*a* may transmit, to the network entity 105-*a*, a beam report 220 (e.g., in UCI) indicating a quantity (e.g., a maximum quantity) of SRS resources supported by the UE 115-*a* for a downlink reference signal (e.g., a CSI-RS 240 or a synchronization signal block (SSB)) transmitted by the network entity 105-*a*. The downlink reference signal may be associated with a transmission configuration indicator (TCI) state of the CSI-RS. For example, the TCI state may be configured with the downlink reference signal or quasi co-located (QCLed) (e.g., directly or indirectly) with the downlink reference signal.

The UE 115-*a* may transmit (e.g., in response to transmitting the beam report 220) a set of SRSs 225 using a subset of SRS resources configured for the downlink reference signal. The quantity of SRSs 225 may be equal to a quantity (e.g., a maximum quantity) of SRS resources supported by the UE 115-*a* (e.g., as indicated in the beam report 220). In one example, the UE 115-*a* may autonomously transmit the SRSs 225 after transmission of the beam report 220. In another example, the UE 115-*a* may transmit the SRSs 225 in response to receiving an acknowledgment from the network entity 105-*a* to the beam report 220. In another alternative, the network entity 105-*a* may transmit a request to the UE 115-*a* for the transmission of the SRSs 225. The quantity of SRS resources may be equal to a quantity of uplink ports (e.g., SRS/PUSCH ports) of an antenna panel of the UE 115-*a* (e.g., an antenna panel used to receive the downlink reference signal).

The network entity 105-*a* may receive the SRSs 225 and schedule a PUSCH 235 via a scheduling DCI 230. The network entity 105-*a* may indicate in the scheduling DCI 230 to use a subset of the SRS resources for transmission of the PUSCH 235. The UE 115-*a* may accordingly transmit the PUSCH 235 using a quantity of PUSCH ports equal to a quantity of SRS resources in the subset of SRS resources.

In some examples, the UE 115-*a* may transmit additional SRSs 225 for a second beam for overlapping PUSCHs 235 (e.g., multi-DCI multi-TRP, or single DCI multi-TRP scenarios). In such examples, the UE 115-*a* may indicate a quantity (e.g., a maximum quantity) of SRS resources supported by the UE 115-*a* for each beam in the overlapping PUSCHs 235. For example, the UE 115-*a* may transmit a quantity of SRSs 225 equal to the maximum quantity of SRS resources supported by the UE 115-*a* for each beam.

Figure 3:
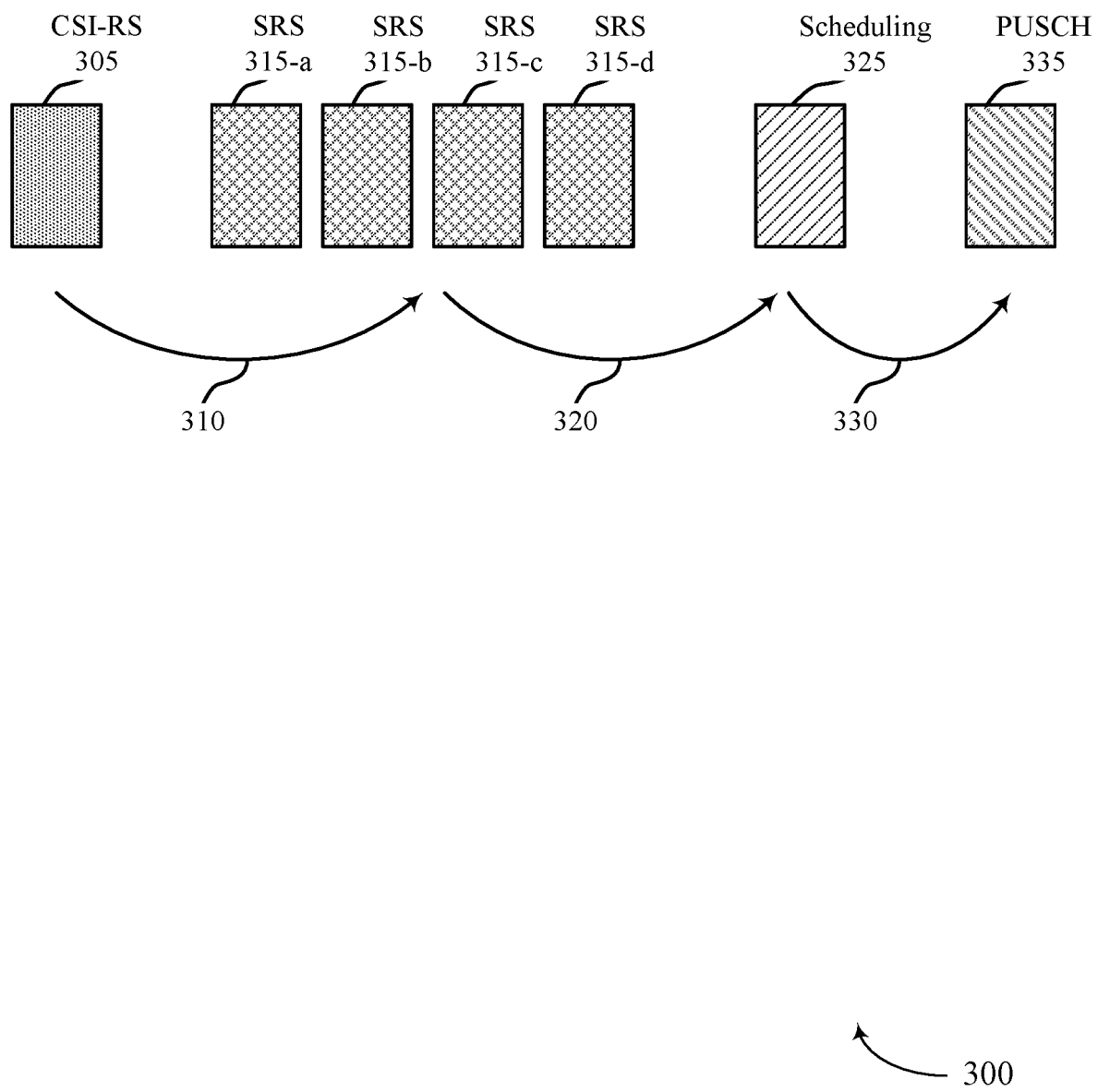
FIG. 3 illustrates an example of a resource diagram that supports techniques for dynamic switching between asymmetric antenna panels for uplink in accordance with one or more aspects of the present disclosure.

FIG. 3 illustrates an example of a resource diagram 300 that supports dynamic panel switching for non-codebook based uplink communications in accordance with one or more aspects of the present disclosure. The resource diagram 300 may implement aspects of or may be implemented by aspects of the wireless communications system 100 or the wireless communications system 200. For example, the resource diagram 300 may include a UE 115 and a network entity 105, which may be examples of the corresponding devices as described with reference to FIG. 1.

As described herein, a UE 115 may communicate with a network entity 105 via non-codebook based uplink transmissions. The UE 115 may measure non-zero power (NZP) CSI-RSs from the network entity 105 via a CSI-RS resource 305 associated with an SRS resource set. For example, RRC signaling may indicate an association of an SRS resource set with the CSI-RS resource 305. In non-codebook based uplink, the UE 115 may not expect to be configured with both the parameters SpatialRelationInfo for SRS and associatedCSI-RS in the field SRS-ResourceSet for an SRS resource set. At 310, the UE 115 may calculate precoding candidates to use in transmission of SRSs via SRS resources 315-*a*, 315-*b*, 315-*c*, and 315-*d* in the SRS resource set. The UE 115 may transmit the SRSs, via the SRS resources 315 (e.g., up to four SRS resources), to the network entity 105 using the calculated precoding candidates. The network entity 105 may measure the SRSs to determine the quality (e.g., signal strength, spectrum efficiencies, etc.) of the precoding candidates. At 320, the network entity 105 may determine, based on the SRSs, one or more of the SRS resources 315 for the UE 115 to use for a PUSCH 335. The network entity 105 may indicate, via an SRI in a scheduling DCI 325, the one or more of the SRS resources 315 for the UE 115 to use for the PUSCH 335. The SRI may be associated with the most recent SRS transmission by the UE 115 prior to the scheduling DCI 325 carrying the SRI. At 330, the UE 115 may transmit the PUSCH 335 via the indicated SRS resources.

For example, the network entity 105 may indicate, via the SRI, the SRS resource 315-*a* and the SRS resource 315-*b*. Because the network entity 105 indicates two SRS resources, the PUSCH 335 may have two layers. Thus, at 330, the UE 115 may transmit the PUSCH 335 using the same precoding and beam as used for the SRSs transmitted via the SRS resource 315-a and the SRS resource 315-b.

Figure 4:
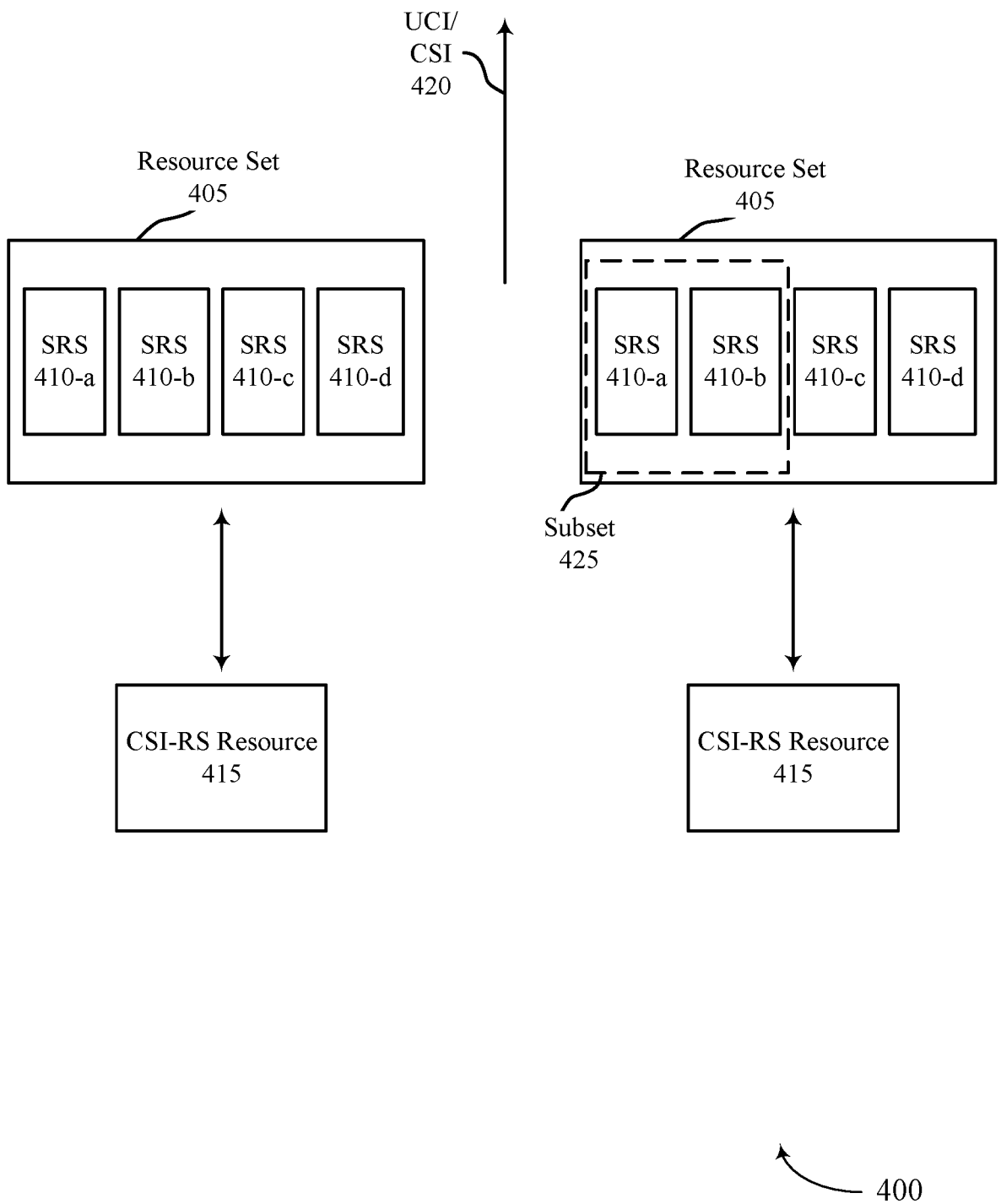
FIG. 4 illustrates an example of a resource diagram that supports techniques for dynamic switching between asymmetric antenna panels for uplink in accordance with one or more aspects of the present disclosure.

FIG. 4 illustrates an example of a resource diagram 400 that supports dynamic panel switching for non-codebook based uplink communications in accordance with one or more aspects of the present disclosure. The resource diagram 400 may implement aspects of or may be implemented by aspects of the wireless communications system 100 or the wireless communications system 200. For example, the resource diagram 400 may be implemented by a UE 115 and/or a network entity 105, which may be examples of the corresponding devices as described with reference to FIG. 1.

In some examples (e.g., if a UE 115 is configured with the parameter associatedCSI-RS in the RRC field SRS-ResourceSet), for single TRP (sTRP) transmissions, the UE 115 may be configured to report, to a network entity 105, a capability index (e.g., a maximum quantity of SRS resources 410 in an SRS resource set 405) associated with a downlink reference signal 415 (e.g., a SSB index or a CSI-RS resource). For non-codebook based uplink communications, the reported capability index may indicate maximum quantity of SRS resources 410 per SRS resource set (e.g., instead of maximum number of SRS ports per SRS resource as in codebook based PUSCH). Accordingly, the capability index may indicate a maximum quantity of uplink (e.g., PUSCH) ports of an antenna panel at the UE 115 used to receive the downlink reference signal 415. The UE 115 may transmit the report via a UCI 420 as part of a layer 1 (L1) beam report (e.g., on a physical uplink control channel (PUCCH) or a PUSCH). For codebook-based PUSCH, the network entity 105 may schedule SRS(s) with a corresponding number of ports if uplink sounding is demanded, and the network entity 105 may schedule a PUSCH with the maximum number of layers limited by the number of supported ports.

In some examples, as described herein, the number of ports of an SRS resource may be changed only by RRC signaling. For example, the UE 115 in some examples may not be capable of dynamically transmitting SRSs from a panel with a larger or smaller capability index (e.g., a panel capable of transmitting more or fewer SRSs). As a result, in such examples, the network entity 105 may be unable to dynamically indicate an increased or reduced number of SRS ports for PUSCH scheduling. In some aspects, unless full power Mode 2 is configured for a UE 115, all SRS resources may have the same number of ports. Even in such a full power Mode 2 configuration, however, a dynamic change of the number of SRS ports of an SRS resource with a TCI state equal to the reported L1 beam may be demanded.

As described herein, for non-codebook based PUSCH, the UE 115 does not expect to be configured with both the parameters SpatialRelationInfo for SRS and associatedCSI-RS in the field SRS-ResourceSet for an SRS resource set. So in a first case, the UE 115 may be configured with associatedCSI-RS in the field SRS-ResourceSet for an SRS resource set. And in a second case, the UE 115 may be configured with spatialRelationInfo for SRS resources.

When UE 115 is configured with associatedCSI-RS in SRS-ResourceSet for an SRS resource set that includes one or more SRS resources for non-codebook based PUSCH, the UE 115 may report the capability index (the maximum number or SRS resources) associated with a downlink reference signal 415 (e.g., an SSB index or a CSI-RS resource) in the UCI 420 (e.g., in a beam report for the downlink reference signal 415). The capability index may indicate the maximum number of uplink (e.g., PUSCH) ports of the panel that was used to receive the downlink reference signal 415. In some cases, the beam report included in the UCI 420 may include a capability index for multiple downlink reference signals.

The UE 115 may determine if a TCI state of a CSI-RS (e.g., a CSI-RS associated with the SRS resource set 405) is associated with the downlink reference signal 415. For example, the network entity 105 may indicate to the UE 115 that the TCI state is associated with the downlink reference signal 415. In some examples, the UE 115 may determine that the TCI state is associated with the downlink reference signal 415 if the TCI state is configured with the downlink reference signal 415, if the TCI state is QCLed with the downlink reference signal 415, or both.

If the TCI state is associated with the downlink reference signal 415, the UE 115 may determine a subset 425 of the SRS resource set 405. For example, the UE 115 may determine a quantity of SRS resources 410 equal to the quantity of SRS resources 410 indicated by the capability index in the UCI 420. That is, for example, if the UE 115 indicated a maximum of two SRS resources 410 in the beam report transmitted via the UCI 420, the UE 115 may determine a subset 425 including two SRS resources (e.g., SRS resource 410-a and SRS resource 410-b). In some examples, if the quantity of SRS resources 410 indicated in the UCI 420 is less than the quantity of SRS resources 410 in the SRS resource set 405, the UE 115 may select the first SRS resources 410 according to the quantity indicated in the UCI 420. In some other examples, the UE 115 may select the SRS resources 410 for the subset 425 according to a rule in a UE specification.

In some examples, the UE 115 may update the maximum quantity of SRS resources 410 (e.g., the quantity of SRS resources 410 in the subset 425) autonomously. That is, the UE 115 may update the quantity of SRS resources 410 after a duration (e.g., a fixed quantity of symbols or slots) after transmitting the UCI 420. In some examples (e.g., to avoid conflicts in case the network entity 105 does not decode the UCI 420), the UE 115 may update the maximum quantity of SRS resources 410 after (e.g., a fixed quantity of symbols or slots after) receiving an acknowledgment message corresponding to the UCI 420 from the network entity 105. The network entity 105 may transmit the acknowledgment message using a DCI or a MAC control element (MAC-CE). In some other examples, the UE 115 may update the maximum quantity of SRS resources 410 when indicated explicitly by the network entity 105. In such examples, the network entity 105 may decide whether and when to update the maximum quantity of SRS resources 410 after receiving the UCI 420.

The UE 115 may transmit, to the network entity 105, one or more SRSs via the subset 425 of SRS resources 410. The network entity 105 may transmit, to the UE 115, scheduling information for a PUSCH transmission, where the scheduling information includes an SRI based on the determined subset 425 of SRS resources 410. For example, the network entity 105 may transmit an uplink grant indicating one or more of the SRS resources 410 in the subset 425 for the UE 115 to use in a PUSCH. The UE 115 may transmit the PUSCH with a quantity of PUSCH ports equal to the indicated quantity of SRS resources 410 (e.g., the indicated one or more of the SRS resources 410 in the subset 425) as described with reference to FIG. 3.

Figure 5:
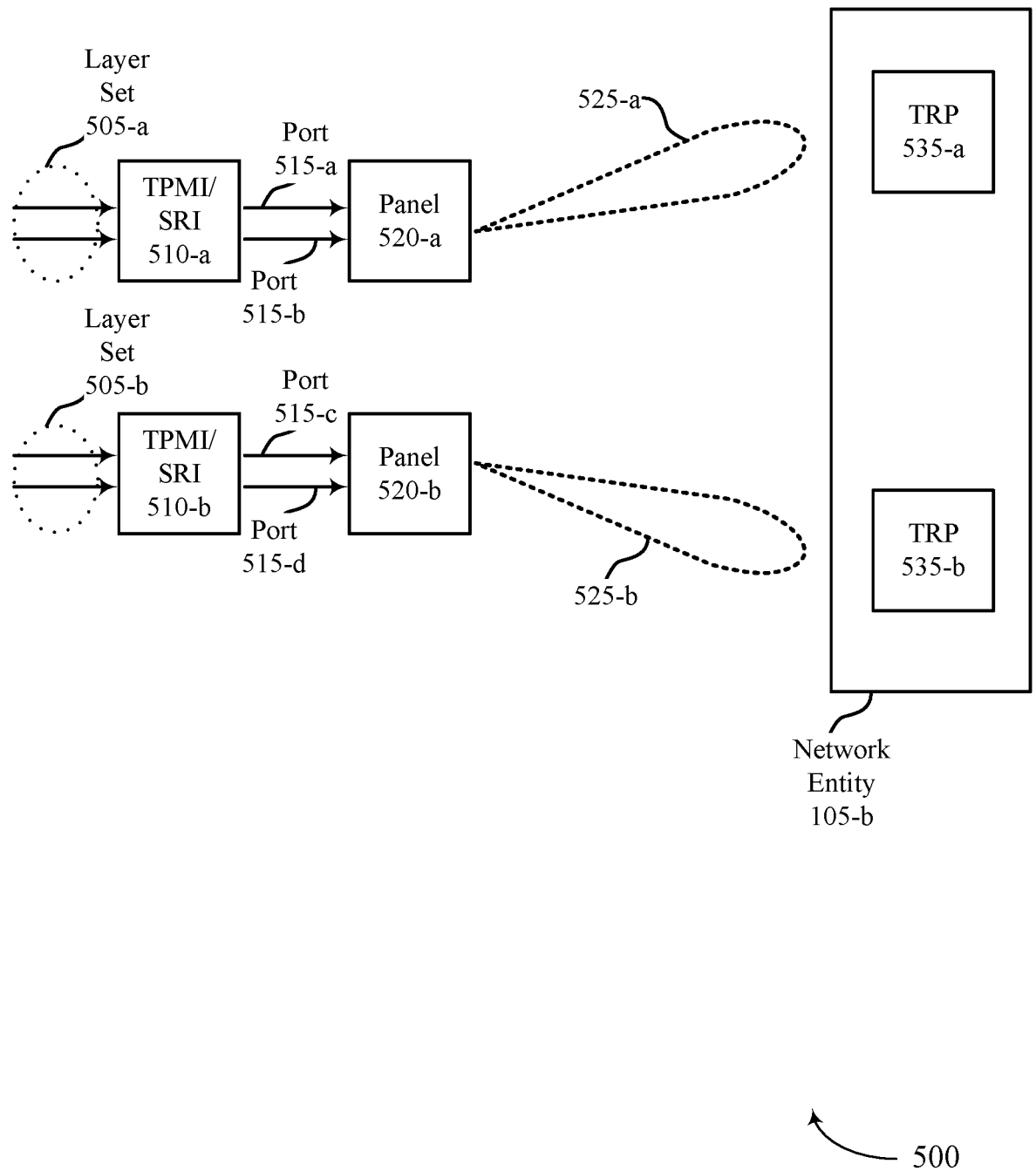
FIG. 5 illustrates an example of a wireless communications system that supports techniques for dynamic switching between asymmetric antenna panels for uplink in accordance with one or more aspects of the present disclosure.

FIG. 5 illustrates an example of a wireless communications system 500 that supports dynamic panel switching for non-codebook based uplink communications in accordance with one or more aspects of the present disclosure. The wireless communications system 500 may implement aspects of or may be implemented by aspects of the wireless communications system 100 or the wireless communications system 200. For example, the wireless communications system 500 may include a UE 115 and a network entity 105 (e.g., a network entity 105-b), which may be examples of the corresponding devices as described with reference to FIG. 1.

In the example of the wireless communications system 500, a UE 115 may communicate with the network entity 105-b using simultaneous transmission across multiple panels (STxMP) of PUSCHs. In one example, the UE 115 may communicate via single-DCI based space division multiplexing (SDM). That is, the network entity 105-a may transmit a single DCI scheduling a PUSCH with multiple sets of ports 515 (e.g., with multiple sets of layers 505 transmitted from multiple panels 520 with different transmission beams 525, precoders, power control parameters, etc.). Each of the multiple sets of layers may be associated with an SRS resource set.

For example, the network entity 105-a may schedule a PUSCH transmission with two sets of layers (e.g., a set of layers 505-a and a set of layers 505-b). Each of the set of layers 505-a and the set of layers 505-b may be associated with a TPMI or SRI (e.g., an SRI 510-a and an SRI 510-b, respectively). Each of the SRI 510-a and the SRI 510-b may indicate two SRS resources associated with two PUSCH ports (e.g., PUSCH ports 515-a and 515-b and PUSCH ports 515-c and 515-d, respectively). Thus, the UE 115 may transmit the PUSCH from two panels (e.g., a panel 520-a associated with the PUSCH ports 515-a and 515-b and a panel 520-b associated with the PUSCH ports 515-c and 515-d). That is, the UE 115 may transmit the PUSCH via a beam 525-a from the panel 520-a to a TRP 535-a at the network entity 105-b and via a beam 525-b from the panel 520-b to a TRP 535-b at the network entity 105-b. Although this example is described with reference to two layers associated with each transmission of the PUSCH (e.g., 2+2 layers), the network entity 105-b may indicate for the UE 115 to transmit the PUSCH with a different combination of layers (e.g., 1+1, 2+1, 1+2, etc.).

In another example, the UE 115 may communicate with the network entity 105-b with overlapping PUSCH transmissions (e.g., multi-DCI based communications with multiple TRPs (mTRP)). That is, the network entity 105-b may transmit multiple DCIs indicating for the UE 115 to transmit at least two different PUSCH transmissions (e.g., a first PUSCH transmission and a second PUSCH transmission) in the same serving cell. The PUSCH transmissions may be overlapping (e.g., partially or fully) in the time domain (e.g., and in the frequency domain). The PUSCH transmissions may be associated with different coresetPoolIndex values (e.g., coresetPoolIndex value 0 and coresetPoolIndex value 1), rather than a same coresetPoolIndex value (e.g., as in single-DCI based SDM). The two PUSCH transmissions may additionally be associated with the first set of layers 505-a and the second set of layers 505-b, respectively (e.g., and different TCI states, power control parameters, precoders, etc.).

For example, the network entity 105-a may schedule two PUSCH transmissions with two sets of layers (e.g., a first PUSCH transmission associated with the set of layers 505-a and a second PUSCH transmission associated with the set of layers 505-b). Each of the set of layers 505-a and the set of layers 505-b may be associated with a TPMI or SRI (e.g., an SRI 510-a and an SRI 510-b, respectively). Each of the SRI 510-a and the SRI 510-b may indicate two SRS resources associated with two PUSCH ports (e.g., PUSCH ports 515-a and 515-b and PUSCH ports 515-c and 515-d, respectively). Thus, the UE 115 may transmit the first PUSCH from the panel 520-a associated with the PUSCH ports 515-a and 515-b and the second PUSCH from the panel 520-b associated with the PUSCH ports 515-c and 515-d. That is, the UE 115 may transmit the first PUSCH via a beam 525-a from the panel 520-a to a TRP 535-a at the network entity 105-b and the second PUSCH via a beam 525-b from the panel 520-b to a TRP 535-b at the network entity 105-b. Although this example is described with reference to two layers associated with each PUSCH (e.g., 2+2 layers), the network entity 105-b may indicate for the UE 115 to transmit each PUSCH with a different combination of layers (e.g., 1+1, 2+1, 1+2, etc.).

However, in the case of sTRP communication, the network entity 105-b may indicate for the UE 115 to use a quantity of SRS resources (e.g., from a resource set) which is greater than the number of resources which may be indicated by the network entity 105-b in the case of mTRP (e.g., for SDM, FDM, or single frequency network schemes). For example, the maximum quantity of layers associated with an SRS resource set in sTRP communication may be larger than the maximum quantity of layers associated with the same SRS resource set in simultaneous transmissions. For example, the layers in a resource set associated with simultaneous transmissions may be a subset of the layers in the resource set associated with sTRP communication. This subset relationship may conflict with the subsets 425 described with reference to FIG. 4.

Figure 6:
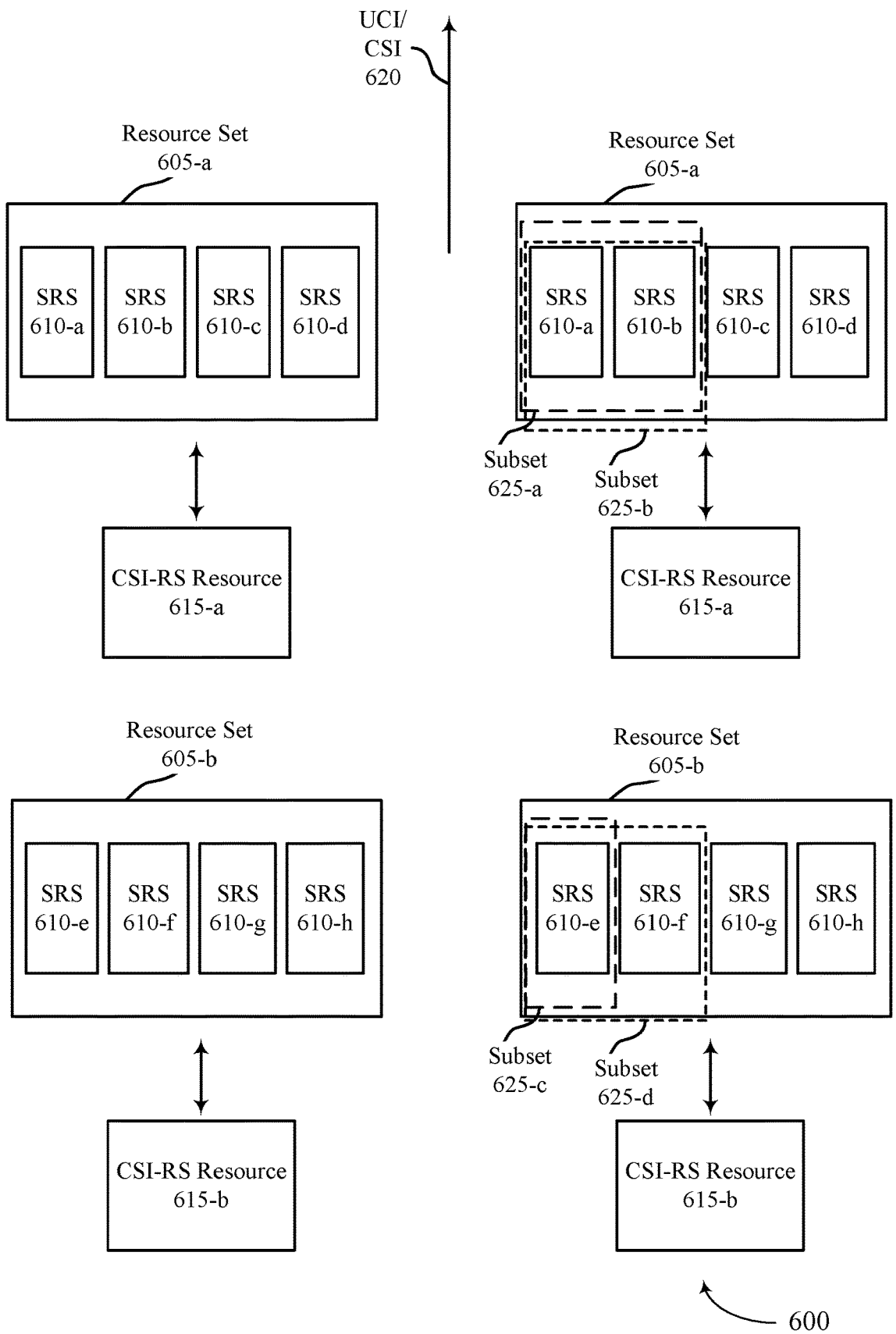
FIG. 6 illustrates an example of a resource diagram that supports techniques for dynamic switching between asymmetric antenna panels for uplink in accordance with one or more aspects of the present disclosure.

FIG. 6 illustrates an example of a resource diagram 600 that supports dynamic panel switching for simultaneous transmissions in non-codebook based uplink communications in accordance with one or more aspects of the present disclosure. The resource diagram 600 may implement aspects of or may be implemented by aspects of the wireless communications system 100, the wireless communications system 200, or the wireless communications system 500. For example, the resource diagram 600 may be implemented by a UE 115 and/or a network entity 105, which may be examples of the corresponding devices as described with reference to FIG. 1.

In some examples (e.g., if a UE 115 is configured with two SRS resource sets 605-a and 605-b and with the parameter associatedCSI-RS in the RRC field SRS-ResourceSet), the UE 115 may report, to a network entity 105, a pair of capability indices (e.g., a maximum quantity of SRS resources 610 in the SRS resource set 605-a and the SRS resource set 605-b) associated with a downlink reference signal 615-a and a downlink reference signal 615-b (e.g., which may each correspond to a SSB index or a CSI-RS resource), respectively. For non-codebook based uplink communications, each maximum quantity of SRS resources 610 may indicate a maximum quantity of uplink (e.g., PUSCH) ports of a panel used to receive the downlink reference signal 615-a and the downlink reference signal 615-b, respectively. The UE 115 may transmit the report via UCI 620 as part of an L1 beam report (e.g., on a PUCCH or a PUSCH).

In some examples, the UE 115 may transmit the pair of capability indices in addition to transmitting an individual capability index report for each downlink reference signal as described with reference to FIG. 4. For example, the UE 115 may report a capability index for the pair of downlink reference signals (615-a, 615-b) if the beams corresponding to the downlink reference signal 615-a and the downlink reference signal 615-b are to be transmitted simultaneously (e.g., for mTRP). Additionally, the UE 115 may report a capability index for the downlink reference signal 615-a and a capability index for the downlink reference signal 615-b individually (e.g., for sTRP). Although this example is described with reference to two layers associated with the downlink reference signal 615-*a* and one layer associated with the downlink reference signal 615-*b* (e.g., 2+1 layers), the downlink reference signal 615-*a* and the downlink reference signal 615-*b* may be associated with a different combination of layers (e.g., 1+1, 1+2, etc.).

The UE 115 may determine if TCI states of CSI-RSs (e.g., a CSI-RS associated with the SRS resource set 605-*a* and a CSI-RS associated with the SRS resource set 605-*b*) are associated with the downlink reference signals 615-*a* and the downlink reference signal 615-*b*, respectively. For example, the network entity 105 may indicate to the UE 115 that a first TCI state is associated with the downlink reference signal 615-*a* and a second TCI state is associated with the downlink reference signal 615-*b*. The network entity 105 may determine that a TCI state is associated with a downlink reference signal 615 if the TCI state is configured with the downlink reference signal 615, if the TCI state is QCLed with the downlink reference signal 615, or both.

In the example of simultaneous transmission, if one or both of the first TCI state and the second TCI state are associated with the downlink reference signal 615-*a* and the downlink reference signal 615-*b*, respectively, the UE 115 may determine a subset 625-*a* of the SRS resource set 605-*a* and a subset 625-*c* of the SRS resource set 605-*b*. For example, the UE 115 may determine a quantity of SRS resources 610 equal to the quantity of SRS resources 610 indicated in the UCI 620. If the downlink reference signal 615-*a* and the downlink reference signal 615-*b* are associated with simultaneous transmissions, the number of SRS resources in the subset 625-*a* and the subset 625-*c* may not exceed the number of SRS resources 610 in the SRS resource set 605-*a* and the SRS resource set 605-*b*, respectively. For example, if the UE 115 indicated capability indices (1+2) in the beam report transmitted via the UCI 620, the UE 115 may determine the subset 625-*a* including two SRS resources (e.g., SRS resource 610-*a* and SRS resource 610-*b*) and the subset 625-*c* including one SRS resource (e.g., SRS resource 610-*e*). In some examples, if the quantity of SRS resources 610 indicated in the UCI 620 is less than the quantity of SRS resources 610 in the SRS resource set 605-*a* and the SRS resource set 605-*b*, the UE 115 may select the first SRS resources 610 or UE 115 may select the SRS resources 610 for the subset 625-*a* and the subset 625-*c* according to a rule in the UE specification as described with reference to FIG. 4.

The UE 115 may transmit, to the network entity 105, one or more SRSs via the subset 625-*a* of the SRS resource set 605-*a* and the subset 625-*c* of SRS resource set 605-*b*. The network entity 105 may transmit, to the UE 115, an SRI scheduling PUSCH transmissions based on the determined subsets 625. That is, the network entity 105 may transmit an uplink grant indicating one or more of the SRS resources 610 in each of the subset 625-*a* and the subset 625-*c* for the UE 115 to use in PUSCH transmissions. The PUSCH transmissions may be multiple transmission occasions of one PUSCH with two TCI states or two overlapping PUSCH transmissions associated with different TCI states. If the SRI bitwidth is a function of an update of the maximum number of SRS resources, the network entity 105 may transmit an SRI field or two SRI fields with different bitwidths. Otherwise, the SRI field may be as described with reference to FIG. 4. The UE 115 may transmit the PUSCH transmissions with quantities of PUSCH ports equal to the indicated quantities of SRS resources 610 (e.g., the indicated one or more of the SRS resources 610 in each of the subset 625-*a* and the subset 625-*c*) as described with reference to FIG. 3.

In the example of sTRP communication, if one of the first TCI state or the second TCI state are associated with the downlink reference signal 615-*a* or the downlink reference signal 615-*b*, respectively, the UE 115 may determine a subset 625-*b* of the SRS resource set 605-*a* and a subset 625-*d* of the SRS resource set 605-*b*. For example, the UE 115 may determine a quantity of SRS resources 610 equal to the quantity of SRS resources 610 indicated in the UCI 620. If the downlink reference signal 615-*a* or the downlink reference signal 615-*b* are associated with sTRP transmissions, the number of SRS resources in the subset 625-*b* and the subset 625-*d* may equal to the number of SRS resources 610 in the SRS resource set 605-*a* and the SRS resource set 605-*b*, respectively. For example, if the UE 115 indicated a capability index of 2 for each of the downlink reference signal 615-*a* and the downlink reference signal 615-*b* in the beam report transmitted via the UCI 620, the UE 115 may determine the subset 625-*b* including two SRS resources (e.g., SRS resource 610-*a* and SRS resource 610-*b*) and the subset 625-*d* including two SRS resources (e.g., SRS resource 610-*e* and SRS resource 610-*f*). In some examples, if the quantity of SRS resources 610 indicated in the UCI 620 is less than the quantity of SRS resources 610 in the SRS resource set 605-*a* and the SRS resource set 605-*b*, the UE 115 may select the first SRS resources 610 or UE 115 may select the SRS resources 610 for the subset 625-*b* and the subset 625-*d* according to a rule in the UE specification as described with reference to FIG. 4.

The UE 115 may transmit one or more SRSs via the subset 625-*b* or the subset 625-*d* of SRS resource set 605-*a* and SRS resource set 605-*b*, respectively. The network entity 105 may transmit, to the UE 115, an SRI scheduling PUSCH transmissions based on one of the subset 625-*b* or the subset 625-*d*. That is, the network entity 105 may transmit an uplink grant indicating one or more of the SRS resources 610 in one of the subset 625-*b* or the subset 625-*d* for the UE 115 to use in a PUSCH transmission. The UE 115 may transmit the PUSCH transmission with a quantity of PUSCH ports equal to the indicated quantity of SRS resources 610 (e.g., the indicated one or more of the SRS resources 610 in the indicated subset 625) as described with reference to FIG. 3.

In some examples, the UE 115 may update the maximum quantity of SRS resources 610 (e.g., the quantity of SRS resources 610 in the subset 625-*a*, 625-*b*, 625-*c*, and/or 625-*d*) autonomously. That is, the UE 115 may update the quantity of SRS resources 610 after a duration (e.g., a fixed quantity of symbols or slots) after transmitting the UCI 620. In some examples (e.g., to avoid conflicts in case the network entity 105 does not decode the UCI 620), the UE 115 may update the maximum quantity of SRS resources 610 after (e.g., a fixed quantity of symbols or slots after) receiving an acknowledgment message corresponding to the UCI 620 from the network entity 105. The network entity 105 may transmit the acknowledgment message using a DCI or a MAC-CE. In some examples, the UE 115 may update the maximum quantity of SRS resources 610 when indicated explicitly by the network entity 105. In such examples, the network entity 105 may decide whether and when to update the maximum quantity of SRS resources 610 after receiving the UCI 620.

Figure 7:
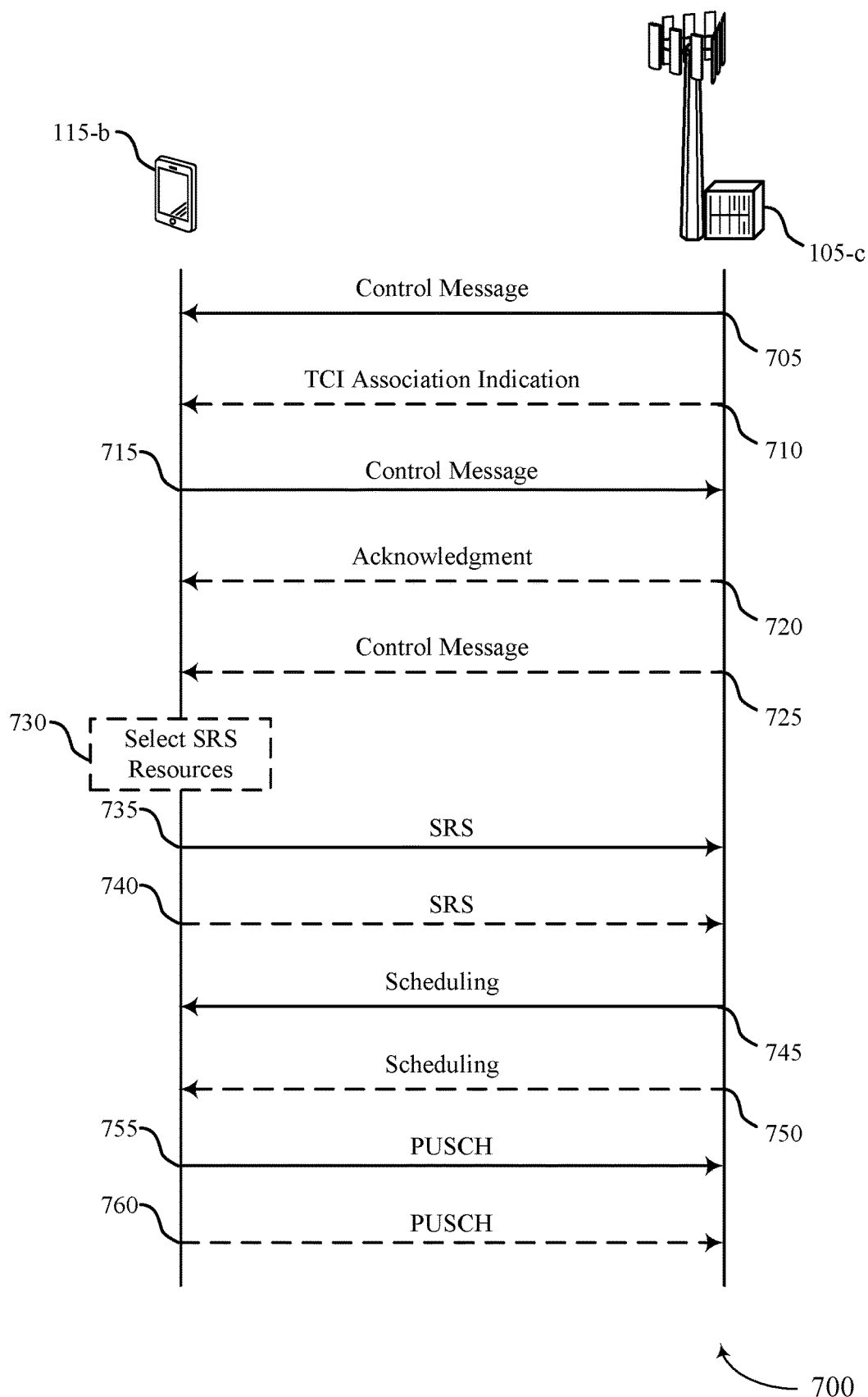
FIG. 7 illustrates an example of a process flow that supports techniques for dynamic switching between asymmetric antenna panels for uplink in accordance with one or more aspects of the present disclosure.

FIG. 7 illustrates an example of a process flow 700 that supports dynamic panel switching for non-codebook based uplink communications in accordance with one or more aspects of the present disclosure. The process flow 700 may implement aspects of or may be implemented by aspects of the wireless communications system 100, the wireless communications system 200, or the wireless communications system 500. For example, the process flow 700 may include a UE 115 (e.g., a UE 115-*b*) and a network entity 105 (e.g., a network entity 105-*c*), which may be examples of the corresponding devices as described with reference to FIG. 1. In the following description of the process flow 700, the operations between the network entity 105-*c* and the UE 115-*b* may be transmitted in a different order than the example order shown. Some operations may also be omitted from the process flow 700, and other operations may be added to the process flow 700.

At 705, the network entity 105-*c* may transmit, to the UE 115-*b*, a first control message indicating a first set of SRS resources associated with a first CSI-RS. In some examples, the control message may further indicate a second set of SRS resources associated with a second CSI-RS.

In some examples, at 710, the network entity 105-*c* may transmit, to the UE 115-*b*, an indication that a first TCI state of the first CSI-RS is associated with a first downlink reference signal. Additionally, the network entity 105-*c* may transmit, to the UE 115-*b*, an indication that a second TCI state of the second CSI-RS is associated with a second downlink reference signal. The network entity 105-*c* may transmit the indication, for example, if a TCI state is configured with a downlink reference signal, or if the TCI state is QCLed with the downlink reference signal.

At 715, the UE 115-*b* may transmit, to the network entity 105-*c*, a second control message indicating a first maximum quantity of SRS resources associated with the first downlink reference signal. The UE 115-*b* may transmit the second control message via a UCI containing a beam report indicating a beam associated with the first downlink reference signal. In some examples, the second control message may also include an indication of a second maximum quantity of SRS resources associated with the second downlink reference signal. In some examples, the second control message may also include an indication of a third and fourth maximum quantity of SRS resources for individual uplink transmissions associated with first and second downlink reference signals, respectively. In some examples, the third maximum quantity of SRS resources may be greater than the first maximum quantity of SRS resources. In some examples, the fourth maximum quantity of SRS resources may be greater than the second maximum quantity of SRS resources.

In some examples, at 720, the network entity 105-*c* may transmit, to the UE 115-*b*, an acknowledgment message in response to receiving the UCI. The UE 115-*b* may transmit a set of SRSs in response to receiving the acknowledgment message, as described with reference to 735.

In some examples, at 725, the network entity 105-*c* may transmit, to the UE 115-*b*, a third control message including a request to update a maximum quantity of SRS resources. The UE 115-*b* may transmit the set of SRSs in response to receiving the third control message, as described with reference to 735.

In some examples, at 730, the UE 115-*b* may select a first subset of SRS resources based on respective index values of SRS resources of the first set of SRS resources. The quantity of SRS resources in the first subset of SRS resources may be equal to the first maximum quantity. The UE 115-*b* may additionally select a second subset of SRS resources based on respective index values of SRS resources of the second set of SRS resources. Additionally, or alternatively, the UE 115-*b* may select a third and fourth subset of SRS resources based on respective index values of SRS resources of the first and second set of SRS resources. The quantity of SRS resources in the second, third, and fourth subsets of SRS resources may be equal to the second, third, and fourth maximum quantities, respectively.

At 735, the UE 115-*b* may transmit, to the network entity 105-*c*, a first set of SRSs via the first subset of SRS resources. As described with reference to 730, the quantity of SRS resources in the first subset of SRS resources may be equal to the first maximum quantity. In some examples, the UE 115-*b* may autonomously transmit the first set of SRSs a duration (e.g., a quantity of symbols or slots) after transmitting the UCI, as described with reference to 715. In some other examples, the UE 115-*b* may transmit the first set of SRSs in response to receiving the acknowledgment or the third control message, as described with reference to 720 and 725, respectively.

In some examples, at 740, the UE 115-*b* may transmit, to the network entity 105-*c*, a second set of SRSs via the second subset of SRS resources. As described with reference to 730, the quantity of SRS resources in the second subset of SRS resources may be equal to the second maximum quantity. In some examples, the UE 115-*b* may autonomously transmit the second set of SRSs a duration (e.g., a quantity of symbols or slots) after transmitting the UCI, as described with reference to 715. In some examples, the UE 115-*b* may transmit the second set of SRSs in response to receiving the acknowledgment or the third control message, as described with reference to 720 and 725, respectively.

At 745, the network entity 105-*c* may transmit, to the UE 115-*b*, first scheduling information for transmission of a first PUSCH. The first scheduling information may indicate one or more SRS resources of the first subset of SRS resources, one or more SRS resources of the second subset of SRS resources, or one or more SRS resources of the third subset of SRS resources. The network entity 105-*c* may transmit the first scheduling information via a first DCI. Additionally, the first DCI may include second scheduling information of a second PUSCH indicating one or more SRS resources of the fourth subset of SRS resources. The second PUSCH may overlap at least partially in time (e.g., and frequency) with the first PUSCH.

In some examples, at 750, the network entity 105-*c* may transmit, to the UE 115-*b*, the second scheduling information of the second PUSCH indicating one or more SRS resources of the fourth subset of SRS resources. The network entity 105-*c* may transmit the second scheduling information via a second DCI. The second PUSCH may overlap at least partially in time (e.g., and frequency) with the first PUSCH.

At 755, the UE 115-*b* may transmit, to the network entity 105-*c*, the first PUSCH transmission using the SRS resources indicated by the first scheduling information. That is, the UE 115-*b* may transmit the first PUSCH using a quantity of PUSCH ports equal to the quantity of SRS resources indicated by the first scheduling information.

In some examples, at 760, UE 115-*b* may transmit, to the network entity 105-*c*, the second PUSCH transmission using the SRS resources indicated by the second scheduling information. That is, the UE 115-*b* may transmit the second PUSCH using a quantity of PUSCH ports equal to the quantity of SRS resources indicated by the second scheduling information.

Figure 8:
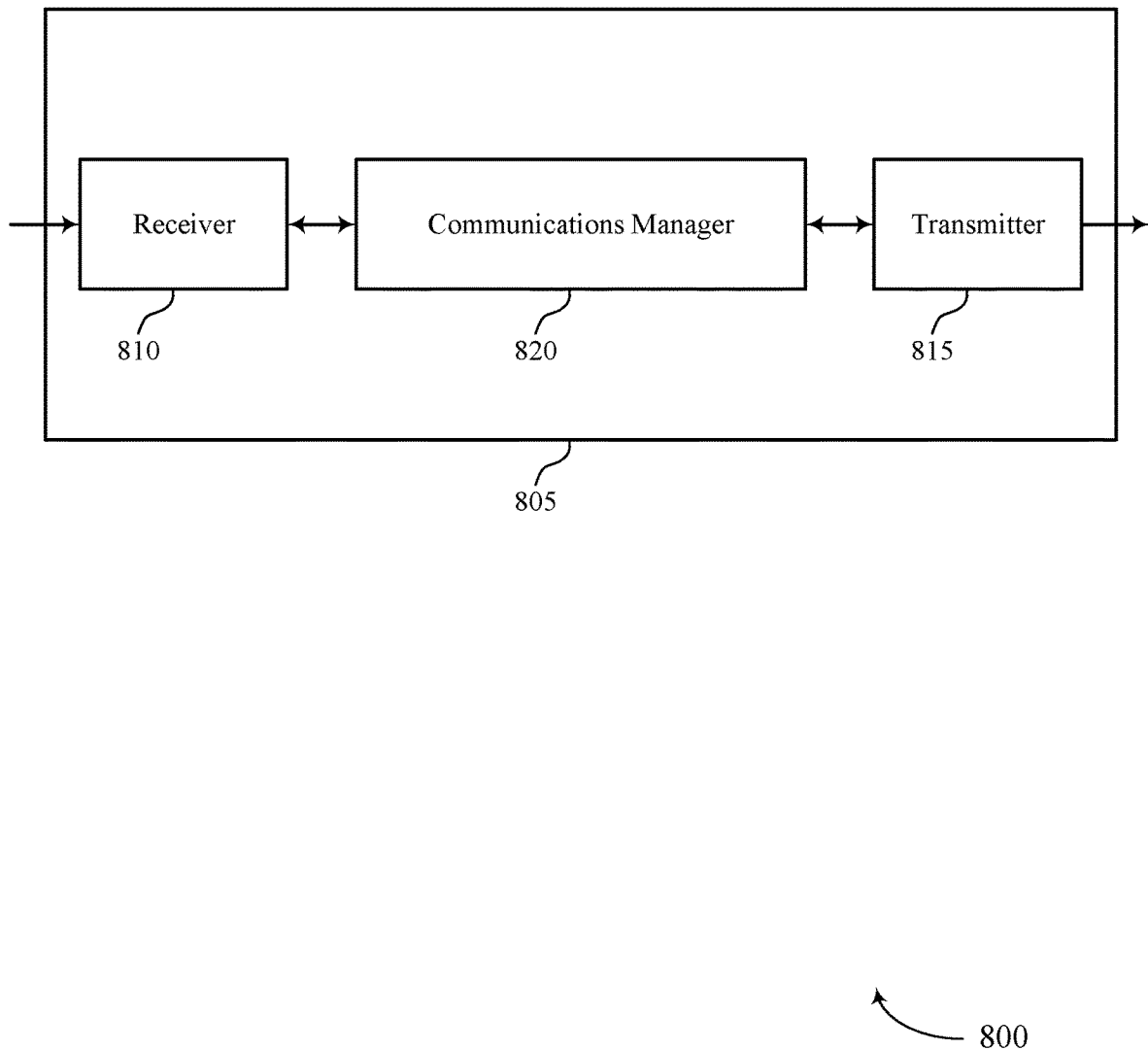
FIGS. 8 and 9 illustrate block diagrams of devices that support techniques for dynamic switching between asymmetric antenna panels for uplink in accordance with one or more aspects of the present disclosure.

FIG. 8 illustrates a block diagram 800 of a device 805 that supports techniques for dynamic switching between asymmetric antenna panels for uplink in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for dynamic switching between asymmetric antenna panels for uplink). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for dynamic switching between asymmetric antenna panels for uplink). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for dynamic switching between asymmetric antenna panels for uplink as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for receiving, from a network entity, a first control message indicating a set of SRS resources associated with a CSI-RS. The communications manager 820 may be configured as or otherwise support a means for transmitting, to the network entity, a second control message indicating a maximum quantity of SRS resources associated with a downlink reference signal received by the UE, where the downlink reference signal is associated with a TCI state of the CSI-RS. The communications manager 820 may be configured as or otherwise support a means for transmitting, to the network entity, a set of SRSs via a subset of the set of SRS resources, where a quantity of SRS resources of the subset of the set of SRS resources is equal to the maximum quantity. The communications manager 820 may be configured as or otherwise support a means for receiving, from the network entity, scheduling information for transmission of an uplink shared channel. The communications manager 820 may be configured as or otherwise support a means for transmitting, to the network entity, the uplink shared channel using a quantity of uplink shared channel ports equal to a quantity of SRS resources indicated by the scheduling information.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for more efficient utilization of communication resources.

Figure 9:
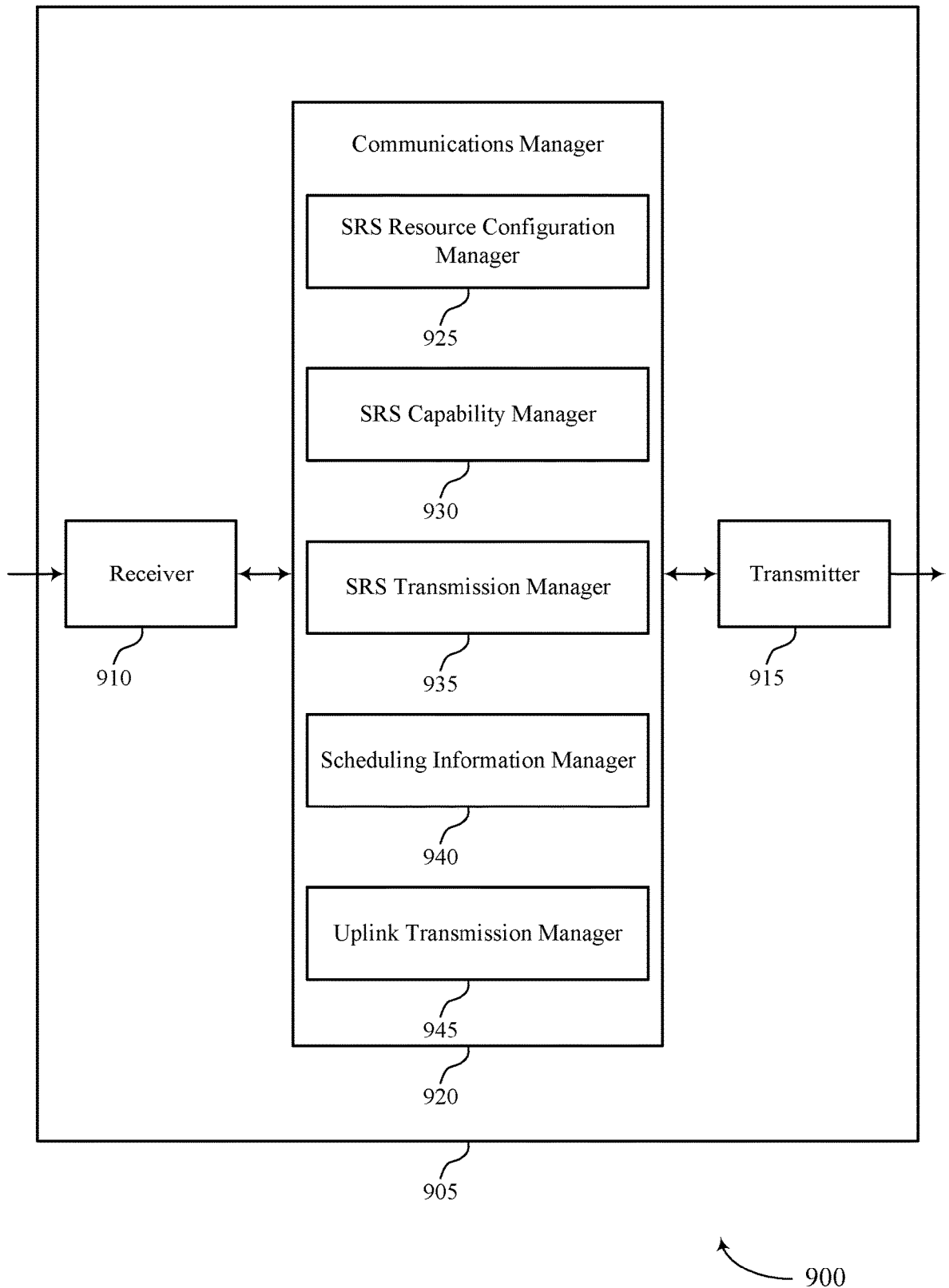

FIG. 9 illustrates a block diagram 900 of a device 905 that supports techniques for dynamic switching between asymmetric antenna panels for uplink in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for dynamic switching between asymmetric antenna panels for uplink). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for dynamic switching between asymmetric antenna panels for uplink). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for dynamic switching between asymmetric antenna panels for uplink as described herein. For example, the communications manager 920 may include an SRS Resource Configuration Manager 925, an SRS Capability Manager 930, an SRS Transmission Manager 935, a Scheduling Information Manager 940, an Uplink Transmission Manager 945, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The SRS Resource Configuration Manager 925 may be configured as or otherwise support a means for receiving, from a network entity, a first control message indicating a set of SRS resources associated with a CSI-RS. The SRS Capability Manager 930 may be configured as or otherwise support a means for transmitting, to the network entity, a second control message indicating a maximum quantity of SRS resources associated with a downlink reference signal received by the UE, where the downlink reference signal is associated with a TCI state of the CSI-RS. The SRS Transmission Manager 935 may be configured as or otherwise support a means for transmitting, to the network entity, a set of SRSs via a subset of the set of SRS resources, where a quantity of SRS resources of the subset of the set of SRS resources is equal to the maximum quantity. The Scheduling Information Manager 940 may be configured as or otherwise support a means for receiving, from the network entity, scheduling information for transmission of an uplink shared channel. The Uplink Transmission Manager 945 may be configured as or otherwise support a means for transmitting, to the network entity, the uplink shared channel using a quantity of uplink shared channel ports equal to a quantity of SRS resources indicated by the scheduling information.

Figure 10:
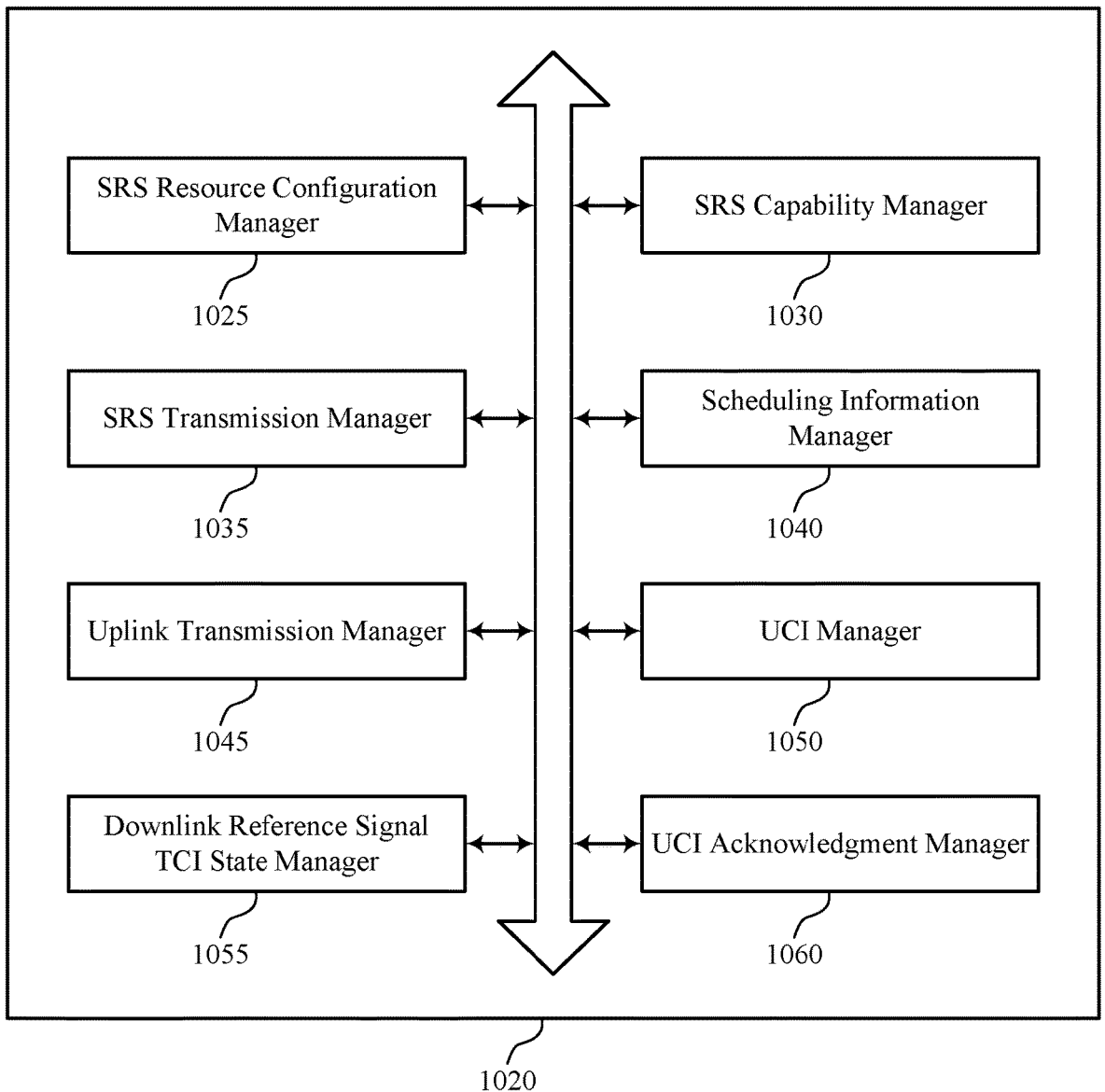
FIG. 10 illustrates a block diagram of a communications manager that supports techniques for dynamic switching between asymmetric antenna panels for uplink in accordance with one or more aspects of the present disclosure.

FIG. 10 illustrates a block diagram 1000 of a communications manager 1020 that supports techniques for dynamic switching between asymmetric antenna panels for uplink in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for dynamic switching between asymmetric antenna panels for uplink as described herein. For example, the communications manager 1020 may include an SRS Resource Configuration Manager 1025, an SRS Capability Manager 1030, an SRS Transmission Manager 1035, a Scheduling Information Manager 1040, an Uplink Transmission Manager 1045, a UCI Manager 1050, a Downlink Reference Signal TCI State Manager 1055, a UCI Acknowledgment Manager 1060, or any combination thereof. Each of these components may communicate, directly or indirectly, with one another (e.g., via one or more buses).

The communications manager 1020 may support wireless communications at a UE in accordance with examples as disclosed herein. The SRS Resource Configuration Manager 1025 may be configured as or otherwise support a means for receiving, from a network entity, a first control message indicating a set of SRS resources associated with a CSI-RS. The SRS Capability Manager 1030 may be configured as or otherwise support a means for transmitting, to the network entity, a second control message indicating a maximum quantity of SRS resources associated with a downlink reference signal received by the UE, where the downlink reference signal is associated with a TCI state of the CSI-RS. The SRS Transmission Manager 1035 may be configured as or otherwise support a means for transmitting, to the network entity, a set of SRSs via a subset of the set of SRS resources, where a quantity of SRS resources of the subset of the set of SRS resources is equal to the maximum quantity. The Scheduling Information Manager 1040 may be configured as or otherwise support a means for receiving, from the network entity, scheduling information for transmission of an uplink shared channel. The Uplink Transmission Manager 1045 may be configured as or otherwise support a means for transmitting, to the network entity, the uplink shared channel using a quantity of uplink shared channel ports equal to a quantity of SRS resources indicated by the scheduling information.

In some examples, to support transmitting the second control message, the UCI Manager 1050 may be configured as or otherwise support a means for transmitting UCI including a beam report indicating a beam associated with the downlink reference signal.

In some examples, to support transmitting the set of SRSs, the SRS Transmission Manager 1035 may be configured as or otherwise support a means for transmitting the set of SRSs after a duration after transmission of the UCI.

In some examples, the UCI Acknowledgment Manager 1060 may be configured as or otherwise support a means for receiving, from the network entity, an acknowledgment responsive to the UCI, where transmitting the set of SRSs is based on reception of the acknowledgment.

In some examples, the SRS Transmission Manager 1035 may be configured as or otherwise support a means for receiving, from the network entity, a third control message indicating to update SRS resources of the set of SRS resources, where transmitting the set of SRSs is based on the third control message.

In some examples, to support receiving the scheduling information, the SRS Resource Configuration Manager 1025 may be configured as or otherwise support a means for receiving an indication of one or more SRS resources of the subset of the set of SRS resources.

In some examples, the Downlink Reference Signal TCI State Manager 1055 may be configured as or otherwise support a means for receiving an indication that the TCI state is QCLed with the downlink reference signal.

In some examples, the Downlink Reference Signal TCI State Manager 1055 may be configured as or otherwise support a means for receiving an indication that the TCI state is configured with the downlink reference signal.

In some examples, the SRS Resource Configuration Manager 1025 may be configured as or otherwise support a means for selecting the subset of the set of SRS resources from the set of SRS resources based on respective index values of SRS resources of the set of SRS resources.

In some examples, the SRS Resource Configuration Manager 1025 may be configured as or otherwise support a means for receiving, via the first control message, an indication of a second set of SRS resources associated with a second CSI-RS. In some examples, the SRS Capability Manager 1030 may be configured as or otherwise support a means for transmitting, via the second control message, an indication of a second maximum quantity of SRS resources associated with a second downlink reference signal received by the UE, where the second downlink reference signal is associated with a second TCI state of the second CSI-RS. In some examples, the SRS Transmission Manager 1035 may be configured as or otherwise support a means for transmitting, to the network entity, a second set of SRSs via a second subset of the second set of SRS resources, where a quantity of SRS resources of the second subset of the second set of SRS resources is equal to the second maximum quantity. In some examples, the Scheduling Information Manager 1040 may be configured as or otherwise support a means for receiving, from the network entity, second scheduling information for transmission of a second uplink shared channel, where the second uplink shared channel at least partially overlaps in time with the uplink shared channel. In some examples, the Uplink Transmission Manager 1045 may be configured as or otherwise support a means for transmitting, to the network entity, the second uplink shared channel using a second quantity of uplink shared channel ports equal to a second quantity of SRS resources indicated by the second scheduling information.

In some examples, the SRS Capability Manager 1030 may be configured as or otherwise support a means for transmitting, via the second control message, an indication of a third maximum quantity of SRS resources for individual uplink transmissions associated with the downlink reference signal, and an indication of a fourth maximum quantity of SRS resources for individual uplink transmissions associated with the second downlink reference signal, where the maximum quantity of SRS resources and the second maximum quantity of SRS resources are associated with overlapping uplink transmissions associated with the downlink reference signal and the second downlink reference signal.

In some examples, to support receiving the scheduling information and the second scheduling information, the Scheduling Information Manager 1040 may be configured as or otherwise support a means for receiving the scheduling information and the second scheduling information via a same DCI.

In some examples, to support receiving the scheduling information and the second scheduling information, the Scheduling Information Manager 1040 may be configured as or otherwise support a means for receiving the scheduling information via a first DCI. In some examples, to support receiving the scheduling information and the second scheduling information, the Scheduling Information Manager 1040 may be configured as or otherwise support a means for receiving the second scheduling information via a second DCI.

Figure 11:
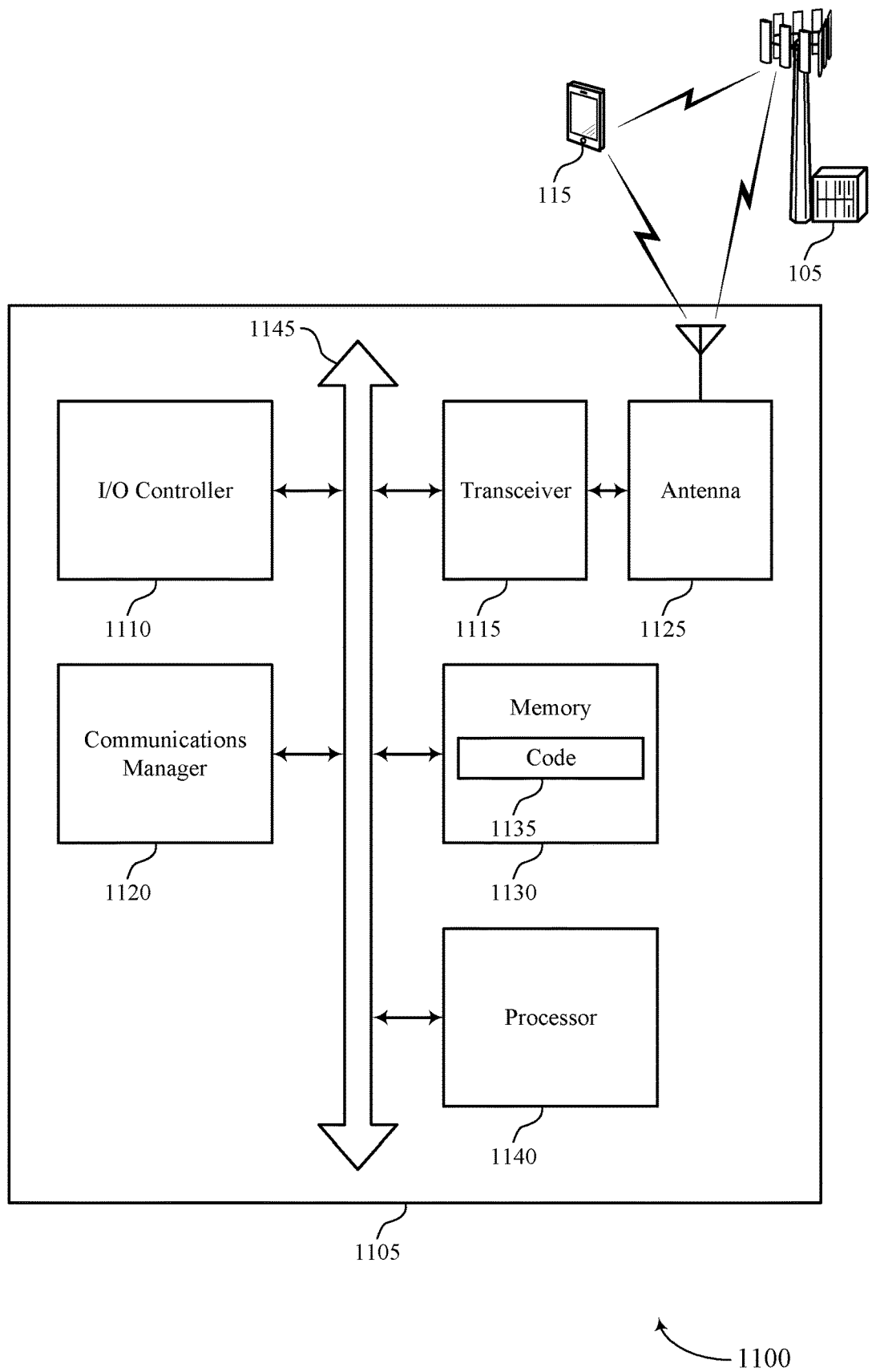
FIG. 11 illustrates a diagram of a system including a device that supports techniques for dynamic switching between asymmetric antenna panels for uplink in accordance with one or more aspects of the present disclosure.

FIG. 11 illustrates a diagram of a system 1100 including a device 1105 that supports techniques for dynamic switching between asymmetric antenna panels for uplink in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more Ues 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for dynamic switching between asymmetric antenna panels for uplink). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a network entity, a first control message indicating a set of SRS resources associated with a CSI-RS. The communications manager 1120 may be configured as or otherwise support a means for transmitting, to the network entity, a second control message indicating a maximum quantity of SRS resources associated with a downlink reference signal received by the UE, where the downlink reference signal is associated with a TCI state of the CSI-RS. The communications manager 1120 may be configured as or otherwise support a means for transmitting, to the network entity, a set of SRSs via a subset of the set of SRS resources, where a quantity of SRS resources of the subset of the set of SRS resources is equal to the maximum quantity. The communications manager 1120 may be configured as or otherwise support a means for receiving, from the network entity, scheduling information for transmission of an uplink shared channel. The communications manager 1120 may be configured as or otherwise support a means for transmitting, to the network entity, the uplink shared channel using a quantity of uplink shared channel ports equal to a quantity of SRS resources indicated by the scheduling information.

By including or configuring the communications manager 1120 in accordance with examples as described herein, the device 1105 may support techniques for improved communication reliability, reduced latency, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for dynamic switching between asymmetric antenna panels for uplink as described herein, or the processor 1140 and the memory 1130 may be otherwise configured to perform or support such operations.

Figure 12:
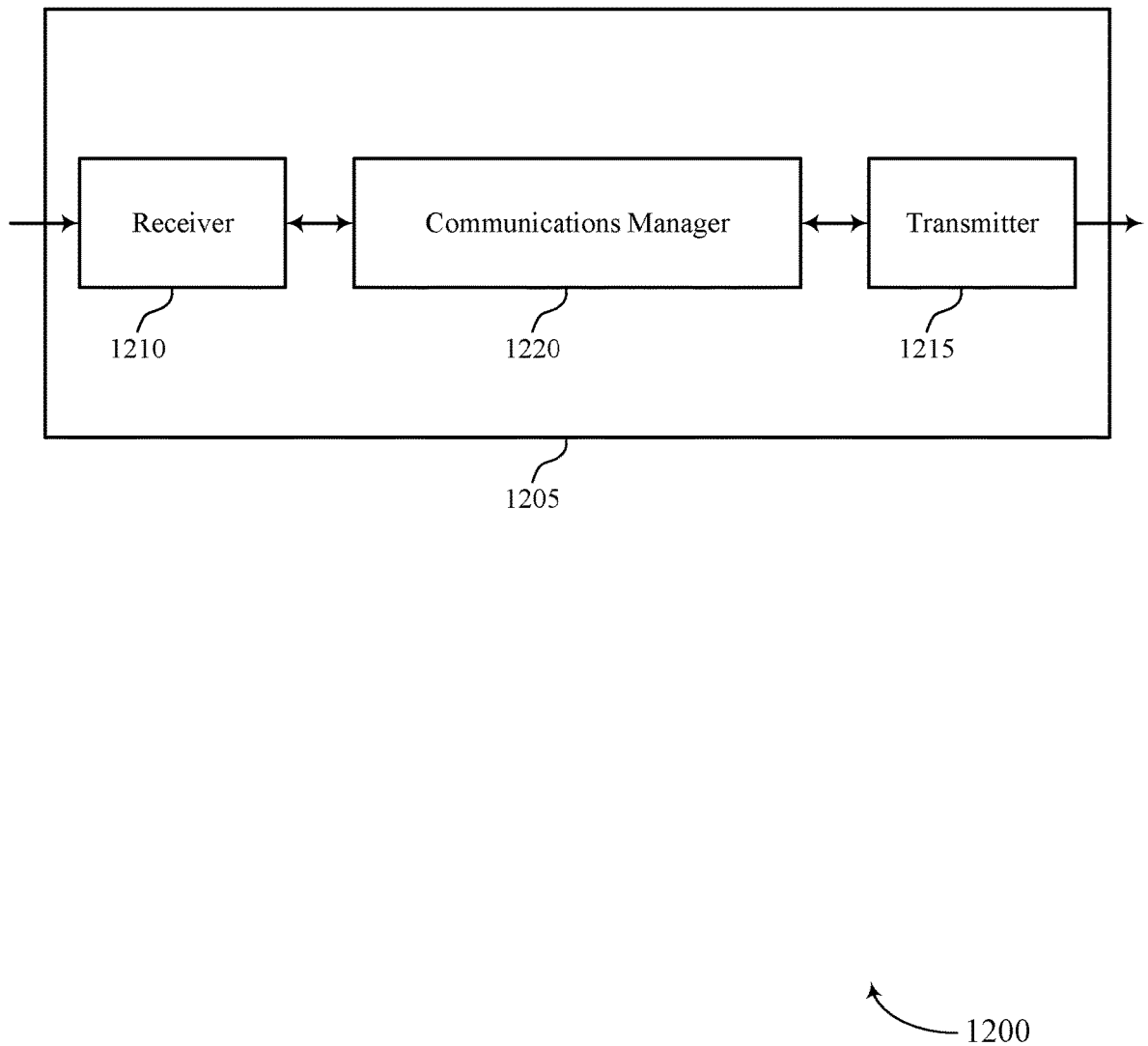
FIGS. 12 and 13 illustrate block diagrams of devices that support techniques for dynamic switching between asymmetric antenna panels for uplink in accordance with one or more aspects of the present disclosure.

FIG. 12 illustrates a block diagram 1200 of a device 1205 that supports techniques for dynamic switching between asymmetric antenna panels for uplink in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of techniques for dynamic switching between asymmetric antenna panels for uplink as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. For example, the communications manager 1220 may be configured as or otherwise support a means for transmitting, to a UE, a first control message indicating a set of SRS resources associated with a CSI-RS. The communications manager 1220 may be configured as or otherwise support a means for receiving, from the UE, a second control message indicating a maximum quantity of SRS resources associated with a downlink reference signal received by the UE, where the downlink reference signal is associated with a TCI state of the CSI-RS. The communications manager 1220 may be configured as or otherwise support a means for receiving, from the UE, a set of SRSs via a subset of the set of SRS resources, where a quantity of SRS resources of the subset of the set of SRS resources is equal to the maximum quantity. The communications manager 1220 may be configured as or otherwise support a means for transmitting, to the UE, scheduling information for transmission of an uplink shared channel. The communications manager 1220 may be configured as or otherwise support a means for receiving, from the UE, the uplink shared channel, where a quantity of layers of the uplink shared channel is equal to a quantity of SRS resources indicated by the scheduling information.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for more efficient utilization of communication resources.

Figure 13:
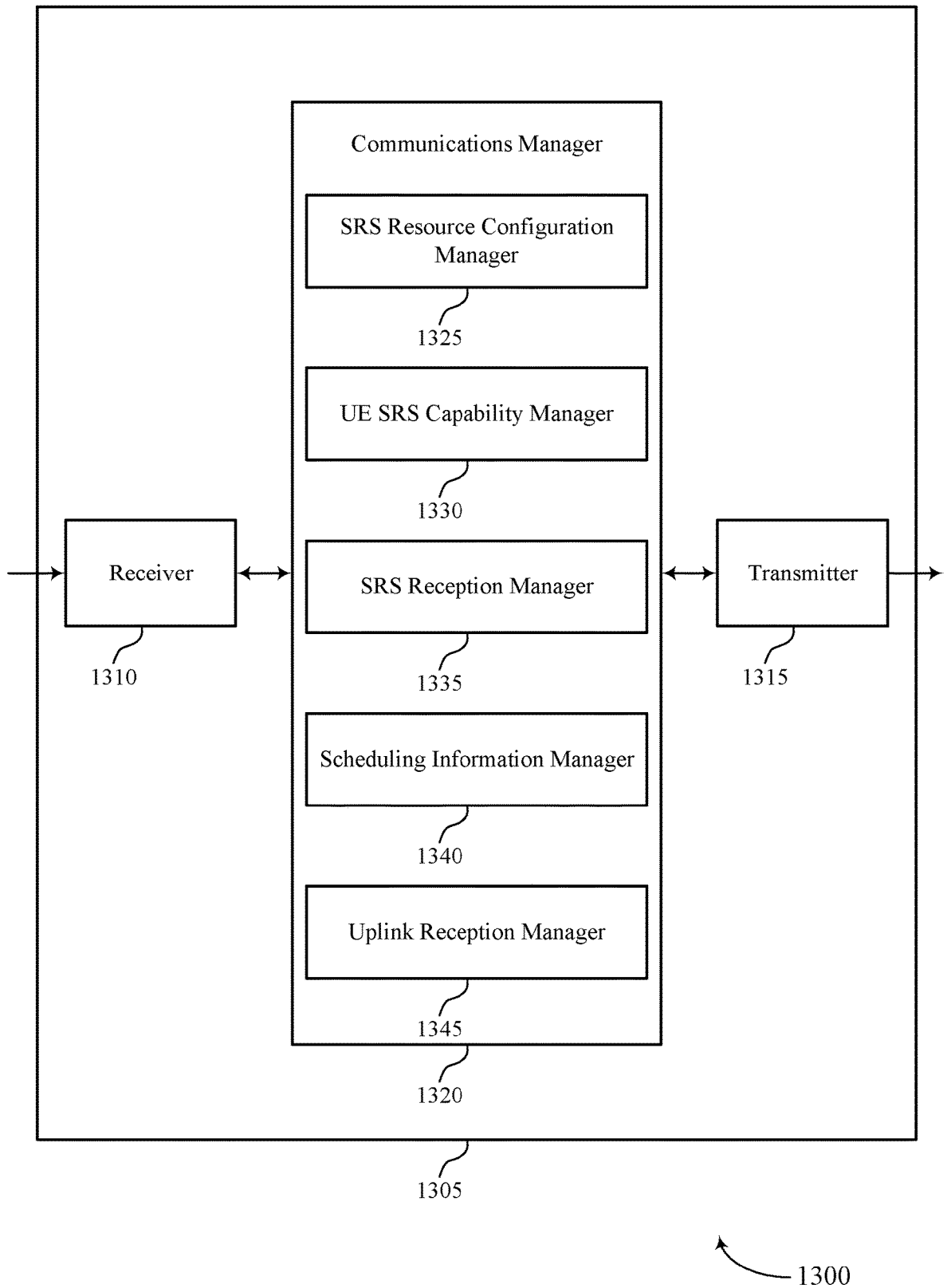

FIG. 13 illustrates a block diagram 1300 of a device 1305 that supports techniques for dynamic switching between asymmetric antenna panels for uplink in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of techniques for dynamic switching between asymmetric antenna panels for uplink as described herein. For example, the communications manager 1320 may include an SRS Resource Configuration Manager 1325, a UE SRS Capability Manager 1330, an SRS Reception Manager 1335, a Scheduling Information Manager 1340, an Uplink Reception Manager 1345, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. The SRS Resource Configuration Manager 1325 may be configured as or otherwise support a means for transmitting, to a UE, a first control message indicating a set of SRS resources associated with a CSI-RS. The UE SRS Capability Manager 1330 may be configured as or otherwise support a means for receiving, from the UE, a second control message indicating a maximum quantity of SRS resources associated with a downlink reference signal received by the UE, where the downlink reference signal is associated with a TCI state of the CSI-RS. The SRS Reception Manager 1335 may be configured as or otherwise support a means for receiving, from the UE, a set of SRSs via a subset of the set of SRS resources, where a quantity of SRS resources of the subset of the set of SRS resources is equal to the maximum quantity. The Scheduling Information Manager 1340 may be configured as or otherwise support a means for transmitting, to the UE, scheduling information for transmission of an uplink shared channel. The Uplink Reception Manager 1345 may be configured as or otherwise support a means for receiving, from the UE, the uplink shared channel, where a quantity of layers of the uplink shared channel is equal to a quantity of SRS resources indicated by the scheduling information.

Figure 14:
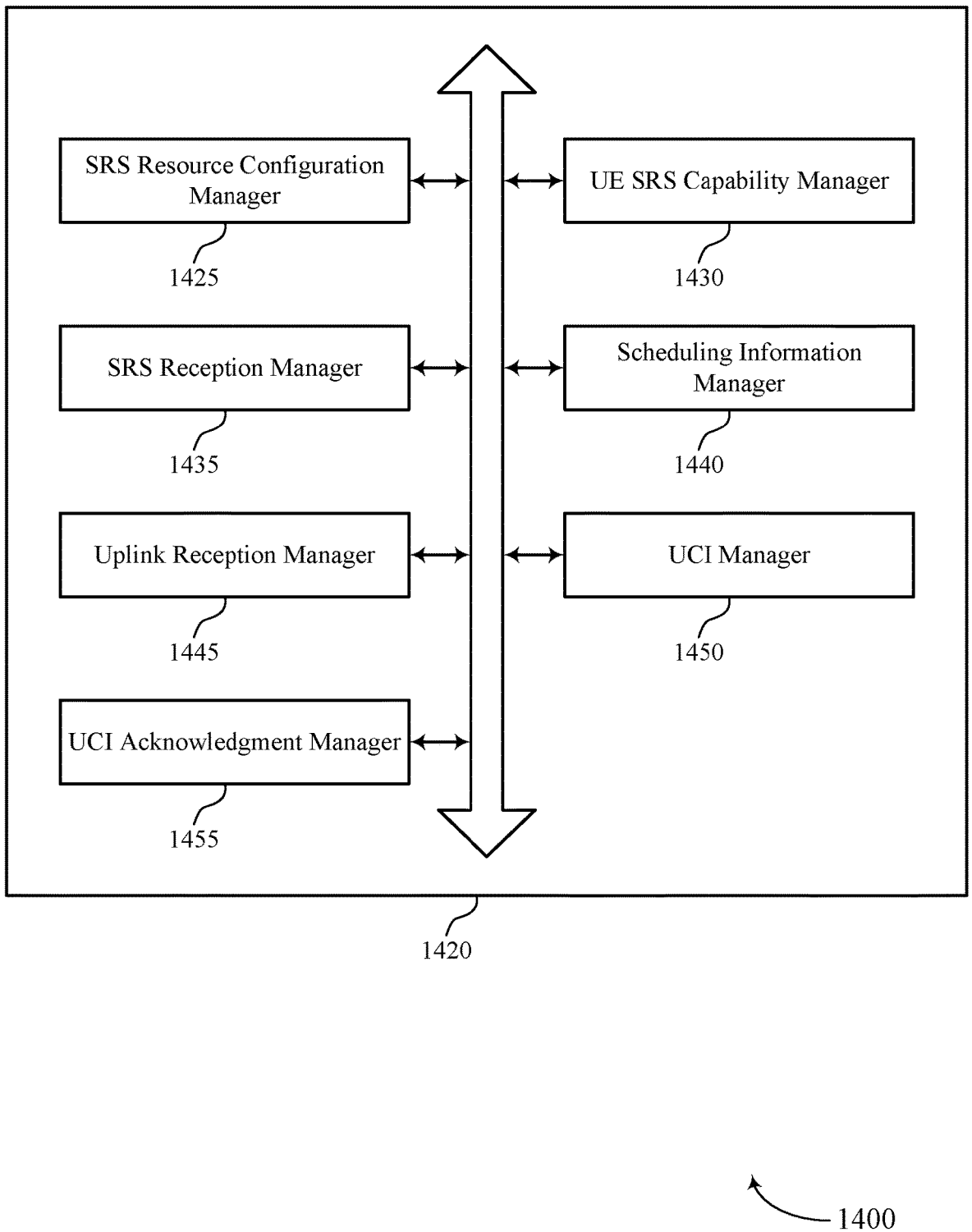
FIG. 14 illustrates a block diagram of a communications manager that supports techniques for dynamic switching between asymmetric antenna panels for uplink in accordance with one or more aspects of the present disclosure.

FIG. 14 illustrates a block diagram 1400 of a communications manager 1420 that supports techniques for dynamic switching between asymmetric antenna panels for uplink in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of techniques for dynamic switching between asymmetric antenna panels for uplink as described herein. For example, the communications manager 1420 may include an SRS Resource Configuration Manager 1425, a UE SRS Capability Manager 1430, an SRS Reception Manager 1435, a Scheduling Information Manager 1440, an Uplink Reception Manager 1445, a UCI Manager 1450, a UCI Acknowledgment Manager 1455, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications at a network entity in accordance with examples as disclosed herein. The SRS Resource Configuration Manager 1425 may be configured as or otherwise support a means for transmitting, to a UE, a first control message indicating a set of SRS resources associated with a CSI-RS. The UE SRS Capability Manager 1430 may be configured as or otherwise support a means for receiving, from the UE, a second control message indicating a maximum quantity of SRS resources associated with a downlink reference signal received by the UE, where the downlink reference signal is associated with a TCI state of the CSI-RS. The SRS Reception Manager 1435 may be configured as or otherwise support a means for receiving, from the UE, a set of SRSs via a subset of the set of SRS resources, where a quantity of SRS resources of the subset of the set of SRS resources is equal to the maximum quantity. The Scheduling Information Manager 1440 may be configured as or otherwise support a means for transmitting, to the UE, scheduling information for transmission of an uplink shared channel. The Uplink Reception Manager 1445 may be configured as or otherwise support a means for receiving, from the UE, the uplink shared channel, where a quantity of layers of the uplink shared channel is equal to a quantity of SRS resources indicated by the scheduling information.

In some examples, to support receiving the second control message, the UCI Manager 1450 may be configured as or otherwise support a means for receiving UCI including a beam report indicating a beam associated with the downlink reference signal.

In some examples, to support receiving the set of SRSs, the SRS Reception Manager 1435 may be configured as or otherwise support a means for receiving the set of SRSs after a duration after reception of the UCI.

In some examples, the UCI Acknowledgment Manager 1455 may be configured as or otherwise support a means for transmitting, to the UE, an acknowledgment responsive to the UCI, where reception of the set of SRSs is based on transmission of the acknowledgment.

In some examples, the SRS Reception Manager 1435 may be configured as or otherwise support a means for transmitting, to the UE, a third control message indicating to update SRS resources of the set of SRS resources, where reception of the set of SRSs is based on the third control message.

In some examples, to support transmitting the scheduling information, the Scheduling Information Manager 1440 may be configured as or otherwise support a means for transmitting an indication of one or more SRS resources of the subset of the set of SRS resources.

In some examples, the SRS Resource Configuration Manager 1425 may be configured as or otherwise support a means for transmitting, via the first control message, an indication of a second set of SRS resources associated with a second CSI-RS. In some examples, the UE SRS Capability Manager 1430 may be configured as or otherwise support a means for receiving, via the second control message, an indication of a second maximum quantity of SRS resources associated with a second downlink reference signal received by the UE, where the second downlink reference signal is associated with a second TCI state of the second CSI-RS. In some examples, the SRS Reception Manager 1435 may be configured as or otherwise support a means for receiving, from the UE, a second set of SRSs via a second subset of the second set of SRS resources, where a quantity of SRS resources of the second subset of the second set of SRS resources is equal to the second maximum quantity. In some examples, the Scheduling Information Manager 1440 may be configured as or otherwise support a means for transmitting, to the UE, second scheduling information for transmission of a second uplink shared channel, where the second uplink shared channel at least partially overlaps in time with the uplink shared channel. In some examples, the Uplink Reception Manager 1445 may be configured as or otherwise support a means for receiving, from the UE, the second uplink shared channel, where a second quantity of layers of the second uplink shared channel is equal to a second quantity of SRS resources indicated by the scheduling information.

In some examples, the UE SRS Capability Manager 1430 may be configured as or otherwise support a means for receiving, via the second control message, an indication of a third maximum quantity of SRS resources for individual uplink transmissions associated with the downlink reference signal, and an indication of a fourth maximum quantity of SRS resources for individual uplink transmissions associated with the second downlink reference signal, where the maximum quantity of SRS resources and the second maximum quantity of SRS resources are associated with overlapping uplink transmissions associated with the downlink reference signal and the second downlink reference signal.

In some examples, to support transmitting the scheduling information and the second scheduling information, the Scheduling Information Manager 1440 may be configured as or otherwise support a means for transmitting the scheduling information and the second scheduling information via a same DCI.

In some examples, to support transmitting the scheduling information and the second scheduling information, the Scheduling Information Manager 1440 may be configured as or otherwise support a means for transmitting the scheduling information via a first DCI. In some examples, to support transmitting the scheduling information and the second scheduling information, the Scheduling Information Manager 1440 may be configured as or otherwise support a means for transmitting the second scheduling information via a second DCI.

Figure 15:
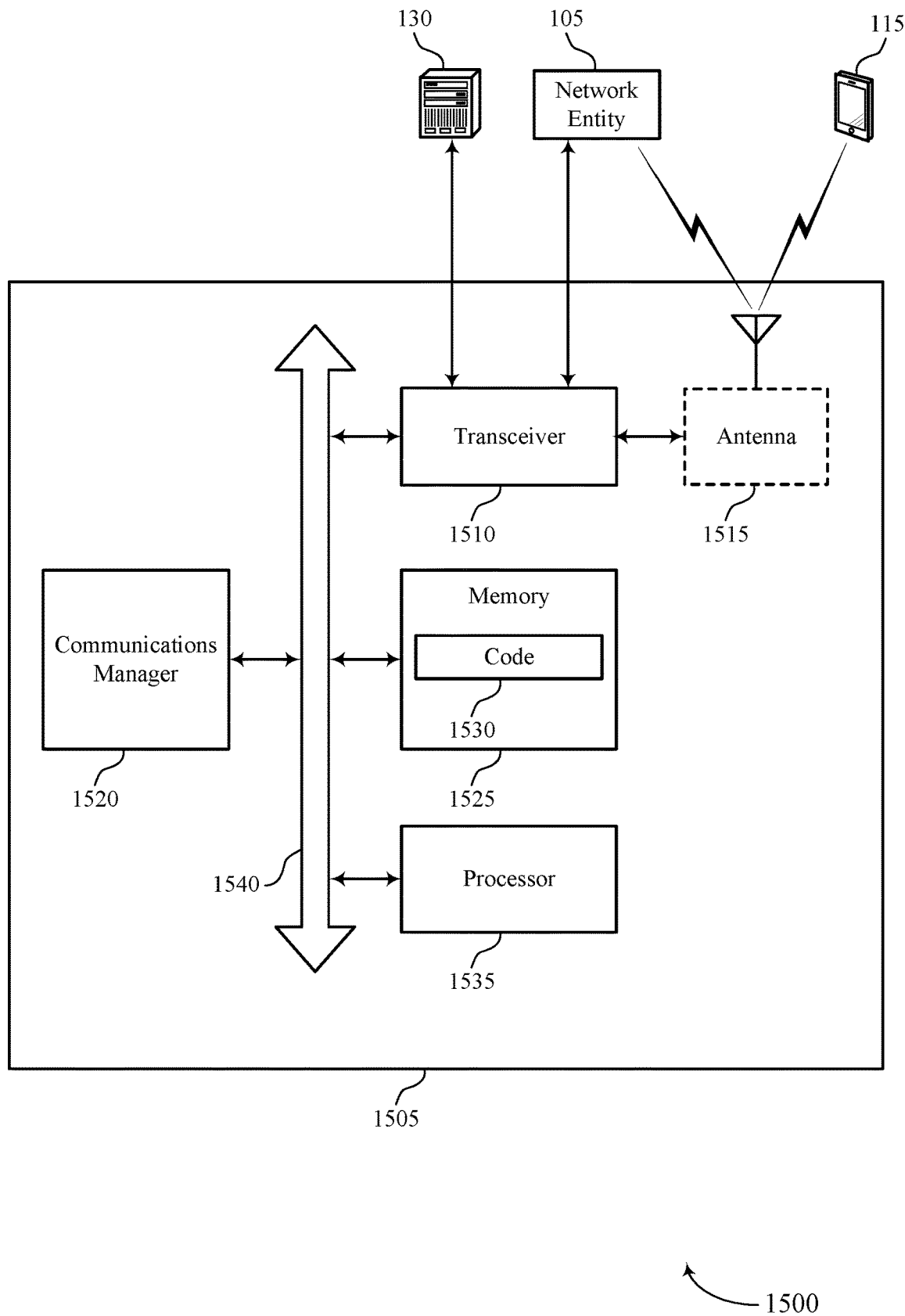
FIG. 15 illustrates a diagram of a system including a device that supports techniques for dynamic switching between asymmetric antenna panels for uplink in accordance with one or more aspects of the present disclosure.

FIG. 15 illustrates a diagram of a system 1500 including a device 1505 that supports techniques for dynamic switching between asymmetric antenna panels for uplink in accordance with one or more aspects of the present disclosure. The device 1505 may be an example of or include the components of a device 1205, a device 1305, or a network entity 105 as described herein. The device 1505 may communicate with one or more network entities 105, one or more Ues 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting techniques for dynamic switching between asymmetric antenna panels for uplink). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more Ues 115. In some examples, the communications manager 1520 may manage communications with other network entities 105, and may include a controller or scheduler for controlling communications with Ues 115 in cooperation with other network entities 105. In some examples, the communications manager 1520 may support an X2 interface within an LTE/LTE-A wireless communications network technology to provide communication between network entities 105.

The communications manager 1520 may support wireless communications at a network entity in accordance with examples as disclosed herein. For example, the communications manager 1520 may be configured as or otherwise support a means for transmitting, to a UE, a first control message indicating a set of SRS resources associated with a CSI-RS. The communications manager 1520 may be configured as or otherwise support a means for receiving, from the UE, a second control message indicating a maximum quantity of SRS resources associated with a downlink reference signal received by the UE, where the downlink reference signal is associated with a TCI state of the CSI-RS. The communications manager 1520 may be configured as or otherwise support a means for receiving, from the UE, a set of SRSs via a subset of the set of SRS resources, where a quantity of SRS resources of the subset of the set of SRS resources is equal to the maximum quantity. The communications manager 1520 may be configured as or otherwise support a means for transmitting, to the UE, scheduling information for transmission of an uplink shared channel. The communications manager 1520 may be configured as or otherwise support a means for receiving, from the UE, the uplink shared channel, where a quantity of layers of the uplink shared channel is equal to a quantity of SRS resources indicated by the scheduling information.

By including or configuring the communications manager 1520 in accordance with examples as described herein, the device 1505 may support techniques for improved communication reliability, reduced latency, more efficient utilization of communication resources, and improved coordination between devices.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of techniques for dynamic switching between asymmetric antenna panels for uplink as described herein, or the processor 1535 and the memory 1525 may be otherwise configured to perform or support such operations.

Figure 16:
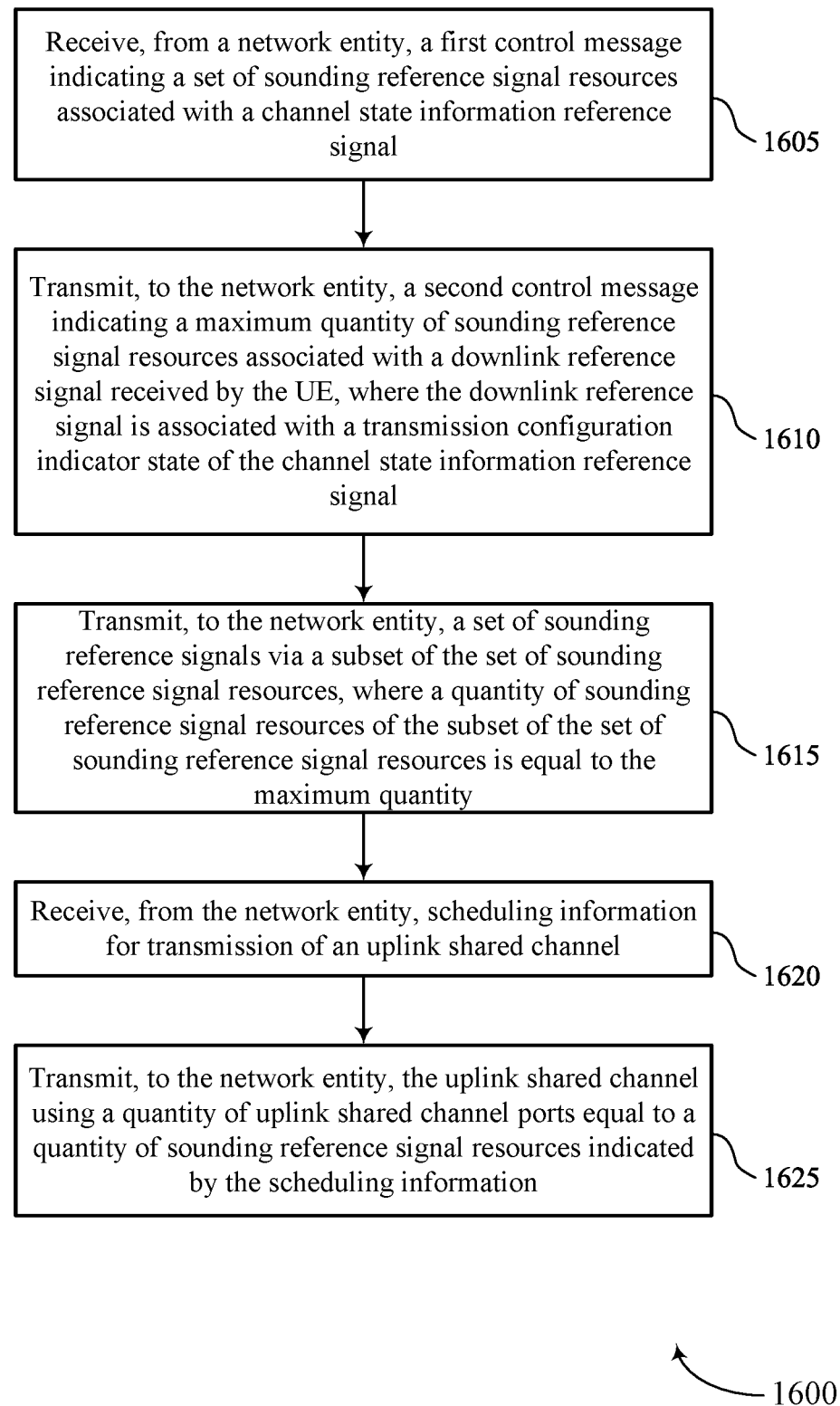
FIGS. 16 through 19 illustrate flowcharts showing methods that support techniques for dynamic switching between asymmetric antenna panels for uplink in accordance with one or more aspects of the present disclosure.

FIG. 16 illustrates a flowchart showing a method 1600 that supports techniques for dynamic switching between asymmetric antenna panels for uplink in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, a first control message indicating a set of SRS resources associated with a CSI-RS. The operations of 1605 may be performed in accordance with examples as disclosed herein. In some examples, aspects of the operations of 1605 may be performed by an SRS Resource Configuration Manager 1025 as described with reference to FIG. 10.

At 1610, the method may include transmitting, to the network entity, a second control message indicating a maximum quantity of SRS resources associated with a downlink reference signal received by the UE, where the downlink reference signal is associated with a TCI state of the CSI-RS. The operations of 1610 may be performed in accordance with examples as disclosed herein. In some examples, aspects of the operations of 1610 may be performed by an SRS Capability Manager 1030 as described with reference to FIG. 10.

At 1615, the method may include transmitting, to the network entity, a set of SRSs via a subset of the set of SRS resources, where a quantity of SRS resources of the subset of the set of SRS resources is equal to the maximum quantity. The operations of 1615 may be performed in accordance with examples as disclosed herein. In some examples, aspects of the operations of 1615 may be performed by an SRS Transmission Manager 1035 as described with reference to FIG. 10.

At 1620, the method may include receiving, from the network entity, scheduling information for transmission of an uplink shared channel. The operations of 1620 may be performed in accordance with examples as disclosed herein. In some examples, aspects of the operations of 1620 may be performed by a Scheduling Information Manager 1040 as described with reference to FIG. 10.

At 1625, the method may include transmitting, to the network entity, the uplink shared channel using a quantity of uplink shared channel ports equal to a quantity of SRS resources indicated by the scheduling information. The operations of 1625 may be performed in accordance with examples as disclosed herein. In some examples, aspects of the operations of 1625 may be performed by an Uplink Transmission Manager 1045 as described with reference to FIG. 10.

Figure 17:
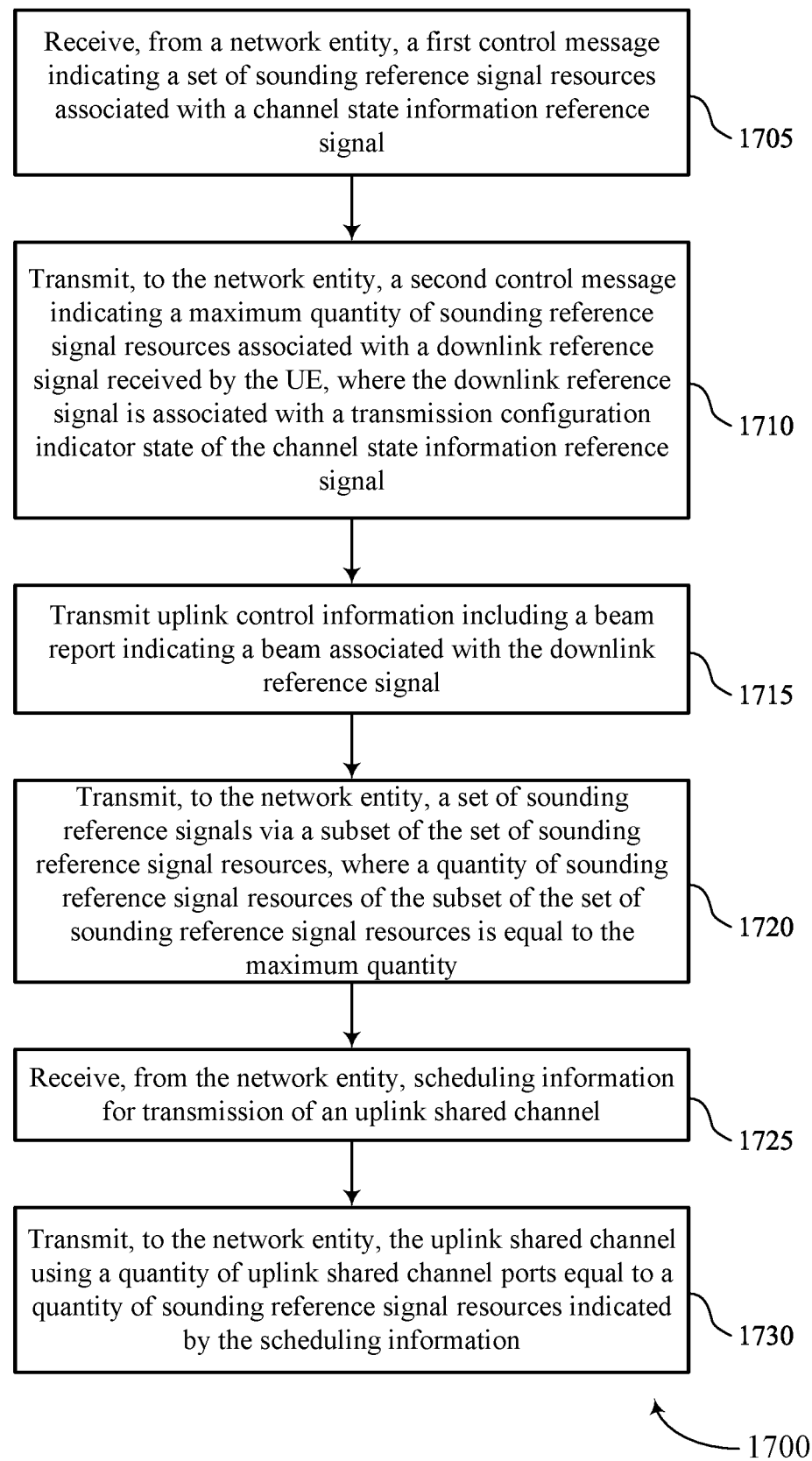

FIG. 17 illustrates a flowchart showing a method 1700 that supports techniques for dynamic switching between asymmetric antenna panels for uplink in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving, from a network entity, a first control message indicating a set of SRS resources associated with a CSI-RS. The operations of 1705 may be performed in accordance with examples as disclosed herein. In some examples, aspects of the operations of 1705 may be performed by an SRS Resource Configuration Manager 1025 as described with reference to FIG. 10.

At 1710, the method may include transmitting, to the network entity, a second control message indicating a maximum quantity of SRS resources associated with a downlink reference signal received by the UE, where the downlink reference signal is associated with a TCI state of the CSI-RS. The operations of 1710 may be performed in accordance with examples as disclosed herein. In some examples, aspects of the operations of 1710 may be performed by an SRS Capability Manager 1030 as described with reference to FIG. 10.

At 1715, the method may include transmitting UCI including a beam report indicating a beam associated with the downlink reference signal. The operations of 1715 may be performed in accordance with examples as disclosed herein. In some examples, aspects of the operations of 1715 may be performed by a UCI Manager 1050 as described with reference to FIG. 10.

At 1720, the method may include transmitting, to the network entity, a set of SRSs via a subset of the set of SRS resources, where a quantity of SRS resources of the subset of the set of SRS resources is equal to the maximum quantity. The operations of 1720 may be performed in accordance with examples as disclosed herein. In some examples, aspects of the operations of 1720 may be performed by an SRS Transmission Manager 1035 as described with reference to FIG. 10.

At 1725, the method may include receiving, from the network entity, scheduling information for transmission of an uplink shared channel. The operations of 1725 may be performed in accordance with examples as disclosed herein. In some examples, aspects of the operations of 1725 may be performed by a Scheduling Information Manager 1040 as described with reference to FIG. 10.

At 1730, the method may include transmitting, to the network entity, the uplink shared channel using a quantity of uplink shared channel ports equal to a quantity of SRS resources indicated by the scheduling information. The operations of 1730 may be performed in accordance with examples as disclosed herein. In some examples, aspects of the operations of 1730 may be performed by an Uplink Transmission Manager 1045 as described with reference to FIG. 10.

Figure 18:
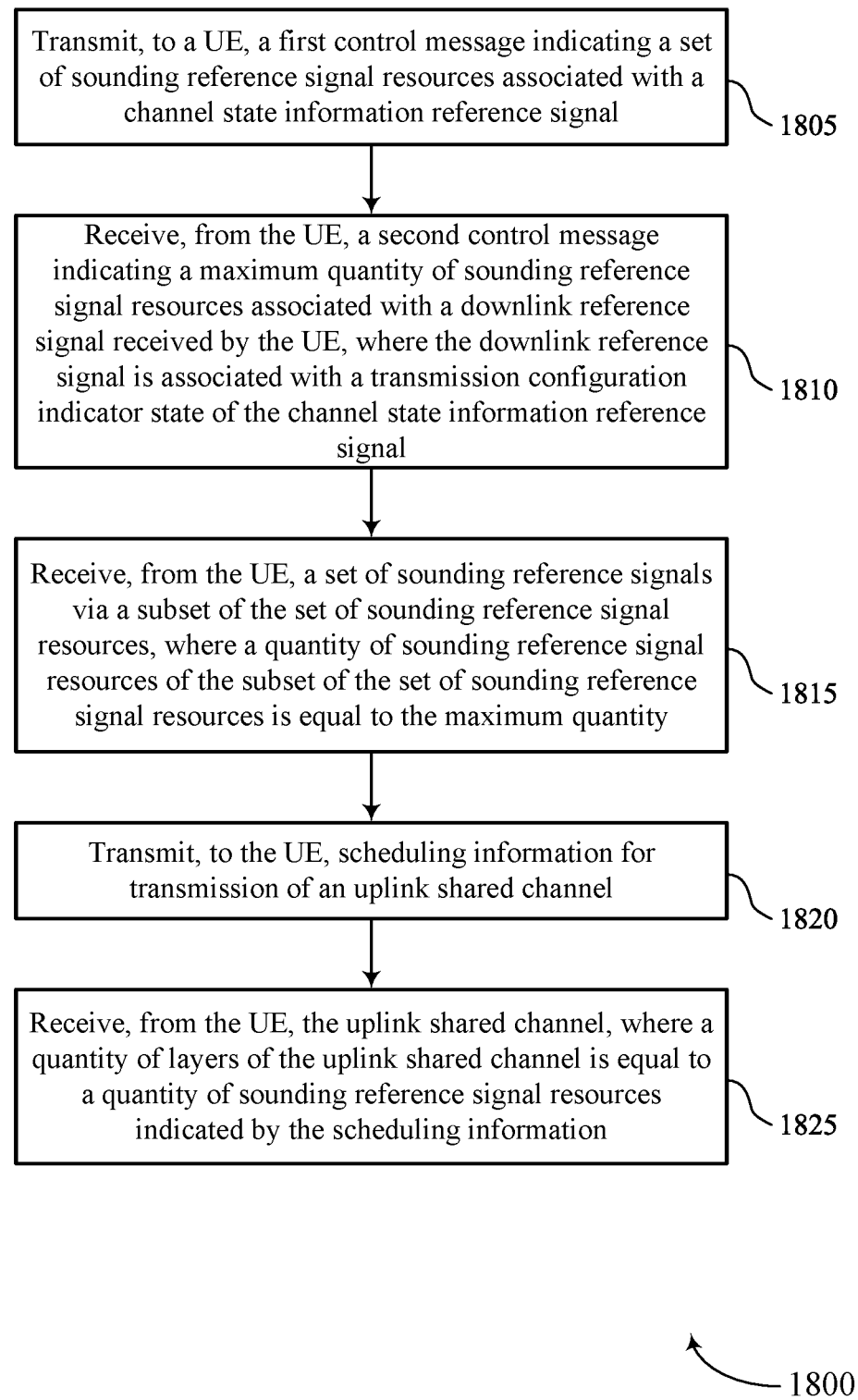

FIG. 18 illustrates a flowchart showing a method 1800 that supports techniques for dynamic switching between asymmetric antenna panels for uplink in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE, a first control message indicating a set of SRS resources associated with a CSI-RS. The operations of 1805 may be performed in accordance with examples as disclosed herein. In some examples, aspects of the operations of 1805 may be performed by an SRS Resource Configuration Manager 1425 as described with reference to FIG. 14.

At 1810, the method may include receiving, from the UE, a second control message indicating a maximum quantity of SRS resources associated with a downlink reference signal received by the UE, where the downlink reference signal is associated with a TCI state of the CSI-RS. The operations of 1810 may be performed in accordance with examples as disclosed herein. In some examples, aspects of the operations of 1810 may be performed by a UE SRS Capability Manager 1430 as described with reference to FIG. 14.

At 1815, the method may include receiving, from the UE, a set of SRSs via a subset of the set of SRS resources, where a quantity of SRS resources of the subset of the set of SRS resources is equal to the maximum quantity. The operations of 1815 may be performed in accordance with examples as disclosed herein. In some examples, aspects of the operations of 1815 may be performed by an SRS Reception Manager 1435 as described with reference to FIG. 14.

At 1820, the method may include transmitting, to the UE, scheduling information for transmission of an uplink shared channel. The operations of 1820 may be performed in accordance with examples as disclosed herein. In some examples, aspects of the operations of 1820 may be performed by a Scheduling Information Manager 1440 as described with reference to FIG. 14.

At 1825, the method may include receiving, from the UE, the uplink shared channel, where a quantity of layers of the uplink shared channel is equal to a quantity of SRS resources indicated by the scheduling information. The operations of 1825 may be performed in accordance with examples as disclosed herein. In some examples, aspects of the operations of 1825 may be performed by an Uplink Reception Manager 1445 as described with reference to FIG. 14.

Figure 19:
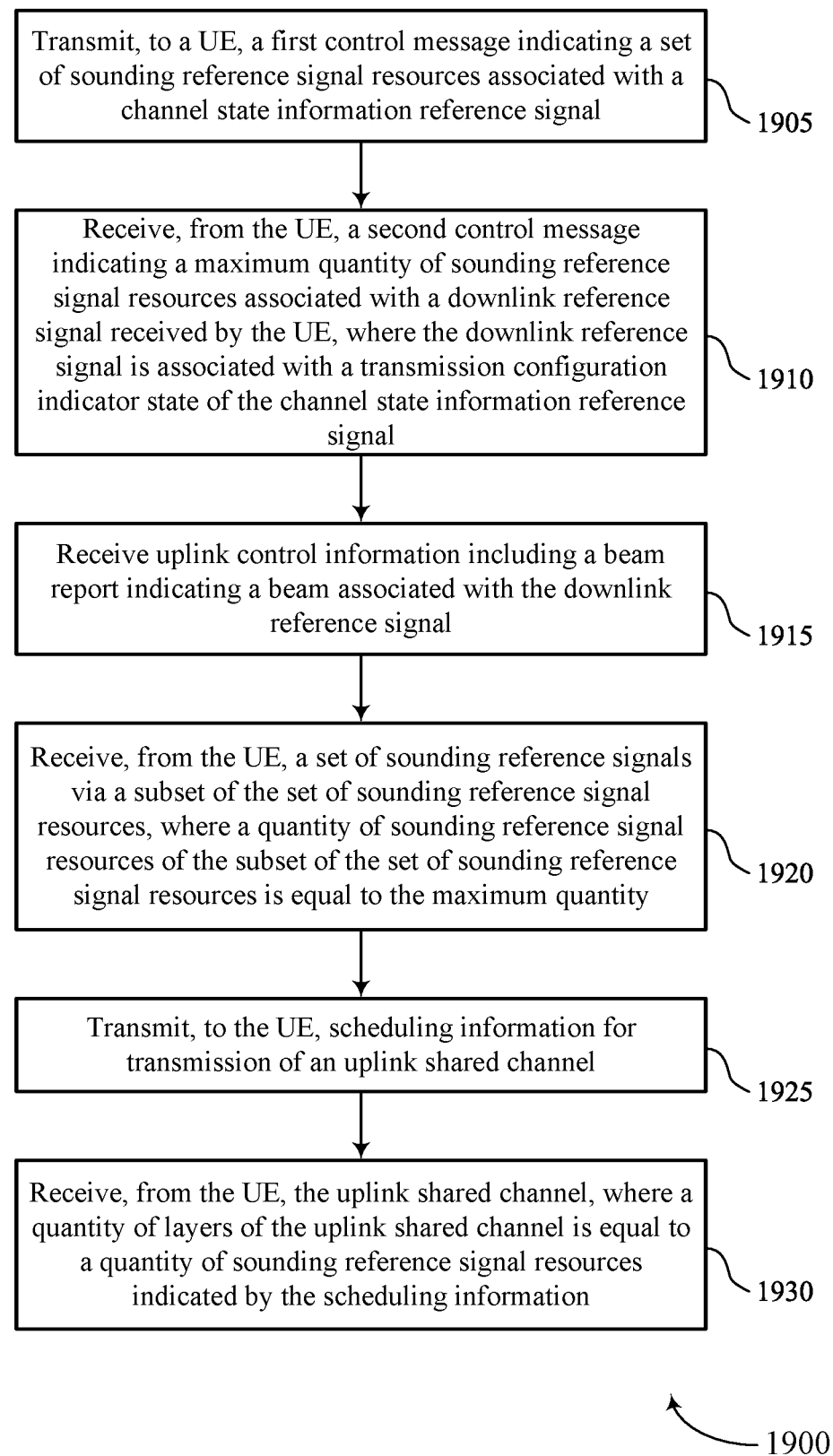

FIG. 19 illustrates a flowchart showing a method 1900 that supports techniques for dynamic switching between asymmetric antenna panels for uplink in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a UE, a first control message indicating a set of SRS resources associated with a CSI-RS. The operations of 1905 may be performed in accordance with examples as disclosed herein. In some examples, aspects of the operations of 1905 may be performed by an SRS Resource Configuration Manager 1425 as described with reference to FIG. 14.

At 1910, the method may include receiving, from the UE, a second control message indicating a maximum quantity of SRS resources associated with a downlink reference signal received by the UE, where the downlink reference signal is associated with a TCI state of the CSI-RS. The operations of 1910 may be performed in accordance with examples as disclosed herein. In some examples, aspects of the operations of 1910 may be performed by a UE SRS Capability Manager 1430 as described with reference to FIG. 14.

At 1915, the method may include receiving UCI including a beam report indicating a beam associated with the downlink reference signal. The operations of 1915 may be performed in accordance with examples as disclosed herein. In some examples, aspects of the operations of 1915 may be performed by a UCI Manager 1450 as described with reference to FIG. 14.

At 1920, the method may include receiving, from the UE, a set of SRSs via a subset of the set of SRS resources, where a quantity of SRS resources of the subset of the set of SRS resources is equal to the maximum quantity. The operations of 1920 may be performed in accordance with examples as disclosed herein. In some examples, aspects of the operations of 1920 may be performed by an SRS Reception Manager 1435 as described with reference to FIG. 14.

At 1925, the method may include transmitting, to the UE, scheduling information for transmission of an uplink shared channel. The operations of 1925 may be performed in accordance with examples as disclosed herein. In some examples, aspects of the operations of 1925 may be performed by a Scheduling Information Manager 1440 as described with reference to FIG. 14.

At 1930, the method may include receiving, from the UE, the uplink shared channel, where a quantity of layers of the uplink shared channel is equal to a quantity of SRS resources indicated by the scheduling information. The operations of 1930 may be performed in accordance with examples as disclosed herein. In some examples, aspects of the operations of 1930 may be performed by an Uplink Reception Manager 1445 as described with reference to FIG. 14.

The following provides an overview of aspects of the present disclosure:

Aspect 1: A method for wireless communications at a UE, comprising: receiving, from a network entity, a first control message indicating a set of SRS resources associated with a CSI-RS; transmitting, to the network entity, a second control message indicating a maximum quantity of SRS resources associated with a downlink reference signal received by the UE, wherein the downlink reference signal is associated with a TCI state of the CSI-RS; transmitting, to the network entity, a set of SRSs via a subset of the set of SRS resources, wherein a quantity of SRS resources of the subset of the set of SRS resources is equal to the maximum quantity; receiving, from the network entity, scheduling information for transmission of an uplink shared channel; and transmitting, to the network entity, the uplink shared channel using a quantity of uplink shared channel ports equal to a quantity of SRS resources indicated by the scheduling information.

Aspect 2: The method of aspect 1, wherein transmitting the second control message comprises: transmitting UCI comprising a beam report indicating a beam associated with the downlink reference signal.

Aspect 3: The method of aspect 2, wherein transmitting the set of SRSs comprises: transmitting the set of SRSs after a duration after transmission of the UCI.

Aspect 4: The method of aspect 2, further comprising: receiving, from the network entity, an acknowledgment responsive to the UCI, wherein transmitting the set of SRSs is based at least in part on reception of the acknowledgment.

Aspect 5: The method of aspect 2, further comprising: receiving, from the network entity, a third control message indicating to update SRS resources of the set of SRS resources, wherein transmitting the set of SRSs is based at least in part on the third control message.

Aspect 6: The method of any of aspects 1 through 5, wherein receiving the scheduling information comprises: receiving an indication of one or more SRS resources of the subset of the set of SRS resources.

Aspect 7: The method of any of aspects 1 through 6, further comprising: receiving an indication that the TCI state is QCLed with the downlink reference signal.

Aspect 8: The method of any of aspects 1 through 7, further comprising: receiving an indication that the TCI state is configured with the downlink reference signal.

Aspect 9: The method of any of aspects 1 through 8, further comprising: selecting the subset of the set of SRS resources from the set of SRS resources based at least in part on respective index values of SRS resources of the set of SRS resources.

Aspect 10: The method of any of aspects 1 through 9, further comprising: receiving, via the first control message, an indication of a second set of SRS resources associated with a second CSI-RS; transmitting, via the second control message, an indication of a second maximum quantity of SRS resources associated with a second downlink reference signal received by the UE, wherein the second downlink reference signal is associated with a second TCI state of the second CSI-RS; transmitting, to the network entity, a second set of SRSs via a second subset of the second set of SRS resources, wherein a quantity of SRS resources of the second subset of the second set of SRS resources is equal to the second maximum quantity; receiving, from the network entity, second scheduling information for transmission of a second uplink shared channel, wherein the second uplink shared channel at least partially overlaps in time with the uplink shared channel; and transmitting, to the network entity, the second uplink shared channel using a second quantity of uplink shared channel ports equal to a second quantity of SRS resources indicated by the second scheduling information.

Aspect 11: The method of aspect 10, further comprising: transmitting, via the second control message, an indication of a third maximum quantity of SRS resources for individual uplink transmissions associated with the downlink reference signal, and an indication of a fourth maximum quantity of SRS resources for individual uplink transmissions associated with the second downlink reference signal, wherein the maximum quantity of SRS resources and the second maximum quantity of SRS resources are associated with overlapping uplink transmissions associated with the downlink reference signal and the second downlink reference signal.

Aspect 12: The method of any of aspects 10 through 11, wherein receiving the scheduling information and the second scheduling information comprises: receiving the scheduling information and the second scheduling information via a same DCI.

Aspect 13: The method of any of aspects 10 through 12, wherein receiving the scheduling information and the second scheduling information comprises: receiving the scheduling information via a first DCI; and receiving the second scheduling information via a second DCI.

Aspect 14: A method for wireless communications at a network entity, comprising: transmitting, to a UE, a first control message indicating a set of SRS resources associated with a CSI-RS; receiving, from the UE, a second control message indicating a maximum quantity of SRS resources associated with a downlink reference signal received by the UE, wherein the downlink reference signal is associated with a TCI state of the CSI-RS; receiving, from the UE, a set of SRSs via a subset of the set of SRS resources, wherein a quantity of SRS resources of the subset of the set of SRS resources is equal to the maximum quantity; transmitting, to the UE, scheduling information for transmission of an uplink shared channel; and receiving, from the UE, the uplink shared channel, wherein a quantity of layers of the uplink shared channel is equal to a quantity of SRS resources indicated by the scheduling information.

Aspect 15: The method of aspect 14, wherein receiving the second control message comprises: receiving UCI comprising a beam report indicating a beam associated with the downlink reference signal.

Aspect 16: The method of aspect 15, wherein receiving the set of SRSs comprises: receiving the set of SRSs after a duration after reception of the UCI.

Aspect 17: The method of aspect 15, further comprising: transmitting, to the UE, an acknowledgment responsive to the UCI, wherein reception of the set of SRSs is based at least in part on transmission of the acknowledgment.

Aspect 18: The method of aspect 15, further comprising: transmitting, to the UE, a third control message indicating to update SRS resources of the set of SRS resources, wherein reception of the set of SRSs is based at least in part on the third control message.

Aspect 19: The method of any of aspects 14 through 18, wherein transmitting the scheduling information comprises: transmitting an indication of one or more SRS resources of the subset of the set of SRS resources.

Aspect 20: The method of any of aspects 14 through 19, further comprising: transmitting, via the first control message, an indication of a second set of SRS resources associated with a second CSI-RS; receiving, via the second control message, an indication of a second maximum quantity of SRS resources associated with a second downlink reference signal received by the UE, wherein the second downlink reference signal is associated with a second TCI state of the second CSI-RS; receiving, from the UE, a second set of SRSs via a second subset of the second set of SRS resources, wherein a quantity of SRS resources of the second subset of the set of SRS resources is equal to the second maximum quantity; transmitting, to the UE, second scheduling information for transmission of a second uplink shared channel, wherein the second uplink shared channel at least partially overlaps in time with the uplink shared channel; and receiving, from the UE, the second uplink shared channel, wherein a second quantity of layers of the second uplink shared channel is equal to a second quantity of SRS resources indicated by the scheduling information.

Aspect 21: The method of aspect 20, further comprising: receiving, via the second control message, an indication of a third maximum quantity of SRS resources for individual uplink transmissions associated with the downlink reference signal, and an indication of a fourth maximum quantity of SRS resources for individual uplink transmissions associated with the second downlink reference signal, wherein the maximum quantity of SRS resources and the second maximum quantity of SRS resources are associated with overlapping uplink transmissions associated with the downlink reference signal and the second downlink reference signal.

Aspect 22: The method of any of aspects 20 through 21, wherein transmitting the scheduling information and the second scheduling information comprises: transmitting the scheduling information and the second scheduling information via a same DCI.

Aspect 23: The method of any of aspects 20 through 22, wherein transmitting the scheduling information and the second scheduling information comprises: transmitting the scheduling information via a first DCI; and transmitting the second scheduling information via a second DCI.

Aspect 24: An apparatus for wireless communications at a UE, comprising one or more memories storing processor-executable code; and one or more processors coupled with the one or more memories and individually or collectively operable to execute the code to cause the UE to perform a method of any of aspects 1 through 13.

Aspect 25: An apparatus for wireless communications at a UE, comprising at least one means for performing a method of any of aspects 1 through 13.

Aspect 26: A non-transitory computer-readable medium storing code for wireless communications at a UE, the code comprising instructions executable by a processor to perform a method of any of aspects 1 through 13.

Aspect 27: An apparatus for wireless communications at a network entity, comprising one or more memories storing processor-executable code; and one or more processors coupled with the one or more memories and individually or collectively operable to execute the code to cause the network entity to perform a method of any of aspects 14 through 23.

Aspect 28: An apparatus for wireless communications at a network entity, comprising at least one means for performing a method of any of aspects 14 through 23.

Aspect 29: A non-transitory computer-readable medium storing code for wireless communications at a network entity, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    one or more memories storing processor-executable code; and
    one or more processors coupled with the one or more memories and individually or collectively operable to execute the code to cause the UE to:
        receive, from a network entity, a first control message indicating a set of sounding reference signal resources associated with a channel state information reference signal;
        transmit, to the network entity, a second control message indicating a maximum quantity of sounding reference signal resources associated with a downlink reference signal received by the UE, wherein the downlink reference signal is associated with a transmission configuration indicator state of the channel state information reference signal;
        transmit, to the network entity, a set of sounding reference signals via a subset of the set of sounding reference signal resources, wherein a quantity of sounding reference signal resources of the subset of the set of sounding reference signal resources is equal to the maximum quantity;

receive, from the network entity, scheduling information for transmission of an uplink shared channel; and transmit, to the network entity, the uplink shared channel using a quantity of uplink shared channel ports equal to a quantity of sounding reference signal resources indicated by the scheduling information.

2. The apparatus of claim 1, wherein, to transmit the second control message, the one or more processors are individually or collectively further operable to execute the code to cause the UE to:

transmit uplink control information comprising a beam report indicating a beam associated with the downlink reference signal.

3. The apparatus of claim 2, wherein to transmit the set of sounding reference signals, the one or more processors are individually or collectively further operable to execute the code to cause the UE to:

transmit the set of sounding reference signals after a duration after transmission of the uplink control information.

4. The apparatus of claim 2, wherein the one or more processors are individually or collectively further operable to execute the code to cause the UE to:

receive, from the network entity, an acknowledgment responsive to the uplink control information, wherein transmitting the set of sounding reference signals is based at least in part on reception of the acknowledgment.

5. The apparatus of claim 2, wherein the one or more processors are individually or collectively further operable to execute the code to cause the UE to:

receive, from the network entity, a third control message indicating to update sounding reference signal resources of the set of sounding reference signal resources, wherein transmitting the set of sounding reference signals is based at least in part on the third control message.

6. The apparatus of claim 1, wherein, to receive the scheduling information, the one or more processors are individually or collectively further operable to execute the code to cause the UE to:

receive an indication of one or more sounding reference signal resources of the subset of the set of sounding reference signal resources.

7. The apparatus of claim 1, wherein the one or more processors are individually or collectively further operable to execute the code to cause the UE to:

receive an indication that the transmission configuration indicator state is quasi co-located with the downlink reference signal.

8. The apparatus of claim 1, wherein the one or more processors are individually or collectively further operable to execute the code to cause the UE to:

receive an indication that the transmission configuration indicator state is configured with the downlink reference signal.

9. The apparatus of claim 1, wherein the one or more processors are individually or collectively further operable to execute the code to cause the UE to:

select the subset of the set of sounding reference signal resources from the set of sounding reference signal resources based at least in part on respective index values of sounding reference signal resources of the set of sounding reference signal resources.

10. The apparatus of claim 1, wherein the one or more processors are individually or collectively further operable to execute the code to cause the UE to:

receive, via the first control message, an indication of a second set of sounding reference signal resources associated with a second channel state information reference signal;

transmit, via the second control message, an indication of a second maximum quantity of sounding reference signal resources associated with a second downlink reference signal received by the UE, wherein the second downlink reference signal is associated with a second transmission configuration indicator state of the second channel state information reference signal;

transmit, to the network entity, a second set of sounding reference signals via a second subset of the second set of sounding reference signal resources, wherein a quantity of sounding reference signal resources of the second subset of the second set of sounding reference signal resources is equal to the second maximum quantity;

receive, from the network entity, second scheduling information for transmission of a second uplink shared channel, wherein the second uplink shared channel at least partially overlaps in time with the uplink shared channel; and transmit, to the network entity, the second uplink shared channel using a second quantity of uplink shared channel ports equal to a second quantity of sounding reference signal resources indicated by the second scheduling information.

11. The apparatus of claim 10, wherein the one or more processors are individually or collectively further operable to execute the code to cause the UE to:

transmit, via the second control message, an indication of a third maximum quantity of sounding reference signal resources for individual uplink transmissions associated with the downlink reference signal, and an indication of a fourth maximum quantity of sounding reference signal resources for individual uplink transmissions associated with the second downlink reference signal, wherein the maximum quantity of sounding reference signal resources and the second maximum quantity of sounding reference signal resources are associated with overlapping uplink transmissions associated with the downlink reference signal and the second downlink reference signal.

12. The apparatus of claim 10, wherein to receive the scheduling information and the second scheduling information, the one or more processors are individually or collectively further operable to execute the code to cause the UE to:

receive the scheduling information and the second scheduling information via a same downlink control information.

13. The apparatus of claim 10, wherein to receive the scheduling information and the second scheduling information, the one or more processors are individually or collectively further operable to execute the code to cause the UE to:

receive the scheduling information via a first downlink control information; and receive the second scheduling information via a second downlink control information.

14. An apparatus for wireless communications at a network entity, comprising:

one or more memories storing processor-executable code; and one or more processors coupled with the one or more memories and individually or collectively operable to execute the code to cause the network entity to:
- transmit, to a user equipment (UE), a first control message indicating a set of sounding reference signal resources associated with a channel state information reference signal;
- receive, from the UE, a second control message indicating a maximum quantity of sounding reference signal resources associated with a downlink reference signal received by the UE, wherein the downlink reference signal is associated with a transmission configuration indicator state of the channel state information reference signal;
- receive, from the UE, a set of sounding reference signals via a subset of the set of sounding reference signal resources, wherein a quantity of sounding reference signal resources of the subset of the set of sounding reference signal resources is equal to the maximum quantity;
- transmit, to the UE, scheduling information for transmission of an uplink shared channel; and
- receive, from the UE, the uplink shared channel, wherein a quantity of layers of the uplink shared channel is equal to a quantity of sounding reference signal resources indicated by the scheduling information.

15. The apparatus of claim 14, wherein to receive the second control message, the one or more processors are individually or collectively further operable to execute the code to cause the network entity to:
- receive uplink control information comprising a beam report indicating a beam associated with the downlink reference signal.

16. The apparatus of claim 15, wherein to receive the set of sounding reference signals, the one or more processors are individually or collectively further operable to execute the code to cause the network entity to:
- receive the set of sounding reference signals after a duration after reception of the uplink control information.

17. The apparatus of claim 15, wherein the one or more processors are individually or collectively further operable to execute the code to cause the network entity to:
- transmit, to the UE, an acknowledgment responsive to the uplink control information, wherein reception of the set of sounding reference signals is based at least in part on transmission of the acknowledgment.

18. The apparatus of claim 15, wherein the one or more processors are individually or collectively further operable to execute the code to cause the network entity to:
- transmit, to the UE, a third control message indicating to update sounding reference signal resources of the set of sounding reference signal resources, wherein reception of the set of sounding reference signals is based at least in part on the third control message.

19. The apparatus of claim 14, wherein the one or more processors are individually or collectively further operable to execute the code to cause the network entity to:
- transmit an indication of one or more sounding reference signal resources of the subset of the set of sounding reference signal resources.

20. The apparatus of claim 14, wherein the one or more processors are individually or collectively further operable to execute the code to cause the network entity to:
- transmit, via the first control message, an indication of a second set of sounding reference signal resources associated with a second channel state information reference signal;
- receive, via the second control message, an indication of a second maximum quantity of sounding reference signal resources associated with a second downlink reference signal received by the UE, wherein the second downlink reference signal is associated with a second transmission configuration indicator state of the second channel state information reference signal;
- receive, from the UE, a second set of sounding reference signals via a second subset of the second set of sounding reference signal resources, wherein a quantity of sounding reference signal resources of the second subset of the second set of sounding reference signal resources is equal to the second maximum quantity;
- transmit, to the UE, second scheduling information for transmission of a second uplink shared channel, wherein the second uplink shared channel at least partially overlaps in time with the uplink shared channel; and
- receive, from the UE, the second uplink shared channel, wherein a second quantity of layers of the second uplink shared channel is equal to a second quantity of sounding reference signal resources indicated by the scheduling information.

21. The apparatus of claim 20, wherein the one or more processors are individually or collectively further operable to execute the code to cause the network entity to:
- receive, via the second control message, an indication of a third maximum quantity of sounding reference signal resources for individual uplink transmissions associated with the downlink reference signal, and an indication of a fourth maximum quantity of sounding reference signal resources for individual uplink transmissions associated with the second downlink reference signal, wherein the maximum quantity of sounding reference signal resources and the second maximum quantity of sounding reference signal resources are associated with overlapping uplink transmissions associated with the downlink reference signal and the second downlink reference signal.

22. The apparatus of claim 20, wherein to transmit the scheduling information and the second scheduling information, the one or more processors are individually or collectively further operable to execute the code to cause the network entity to:
- transmit the scheduling information and the second scheduling information via a same downlink control information.

23. The apparatus of claim 20, wherein to transmit the scheduling information and the second scheduling information, the one or more processors are individually or collectively further operable to execute the code to cause the network entity to:
- transmit the scheduling information via a first downlink control information; and
- transmit the second scheduling information via a second downlink control information.

24. A method for wireless communications at a user equipment (UE), comprising:
- receiving, from a network entity, a first control message indicating a set of sounding reference signal resources associated with a channel state information reference signal;

transmitting, to the network entity, a second control message indicating a maximum quantity of sounding reference signal resources associated with a downlink reference signal received by the UE, wherein the downlink reference signal is associated with a transmission configuration indicator state of the channel state information reference signal;

transmitting, to the network entity, a set of sounding reference signals via a subset of the set of sounding reference signal resources, wherein a quantity of sounding reference signal resources of the subset of the set of sounding reference signal resources is equal to the maximum quantity;

receiving, from the network entity, scheduling information for transmission of an uplink shared channel; and transmitting, to the network entity, the uplink shared channel using a quantity of uplink shared channel ports equal to a quantity of sounding reference signal resources indicated by the scheduling information.

25. The method of claim 24, wherein transmitting the second control message comprises:

transmitting uplink control information comprising a beam report indicating a beam associated with the downlink reference signal.

26. The method of claim 25, wherein transmitting the set of sounding reference signals comprises:

transmitting the set of sounding reference signals after a duration after transmission of the uplink control information.

27. The method of claim 25, further comprising:

receiving, from the network entity, an acknowledgment responsive to the uplink control information, wherein transmitting the set of sounding reference signals is based at least in part on reception of the acknowledgment.

28. The method of claim 25, further comprising:

receiving, from the network entity, a third control message indicating to update sounding reference signal resources of the set of sounding reference signal resources, wherein transmitting the set of sounding reference signals is based at least in part on the third control message.

29. The method of claim 24, wherein receiving the scheduling information comprises:

receiving an indication of one or more sounding reference signal resources of the subset of the set of sounding reference signal resources.

30. A method for wireless communications at a network entity, comprising:

transmitting, to a user equipment (UE), a first control message indicating a set of sounding reference signal resources associated with a channel state information reference signal;

receiving, from the UE, a second control message indicating a maximum quantity of sounding reference signal resources associated with a downlink reference signal received by the UE, wherein the downlink reference signal is associated with a transmission configuration indicator state of the channel state information reference signal;

receiving, from the UE, a set of sounding reference signals via a subset of the set of sounding reference signal resources, wherein a quantity of sounding reference signal resources of the subset of the set of sounding reference signal resources is equal to the maximum quantity;

transmitting, to the UE, scheduling information for transmission of an uplink shared channel; and receiving, from the UE, the uplink shared channel, wherein a quantity of layers of the uplink shared channel is equal to a quantity of sounding reference signal resources indicated by the scheduling information.

* * * * *